Nov. 4, 1958

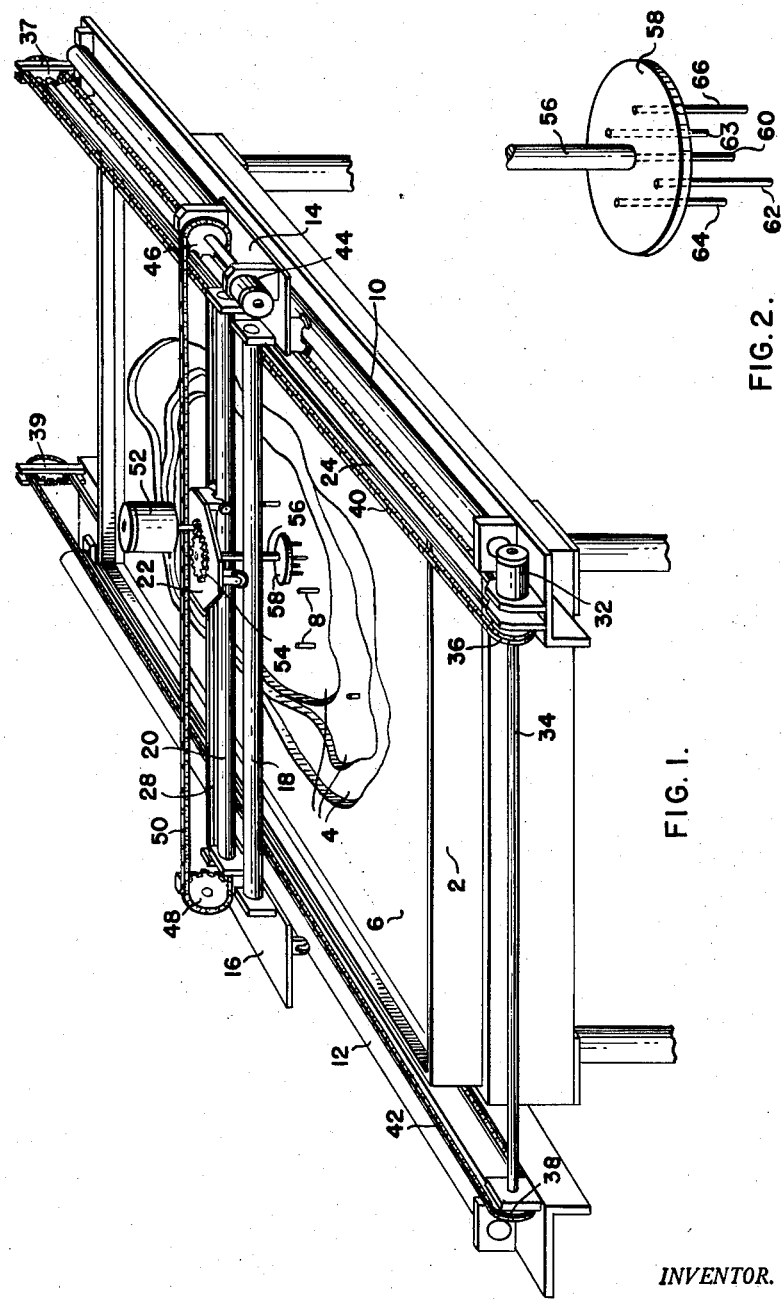

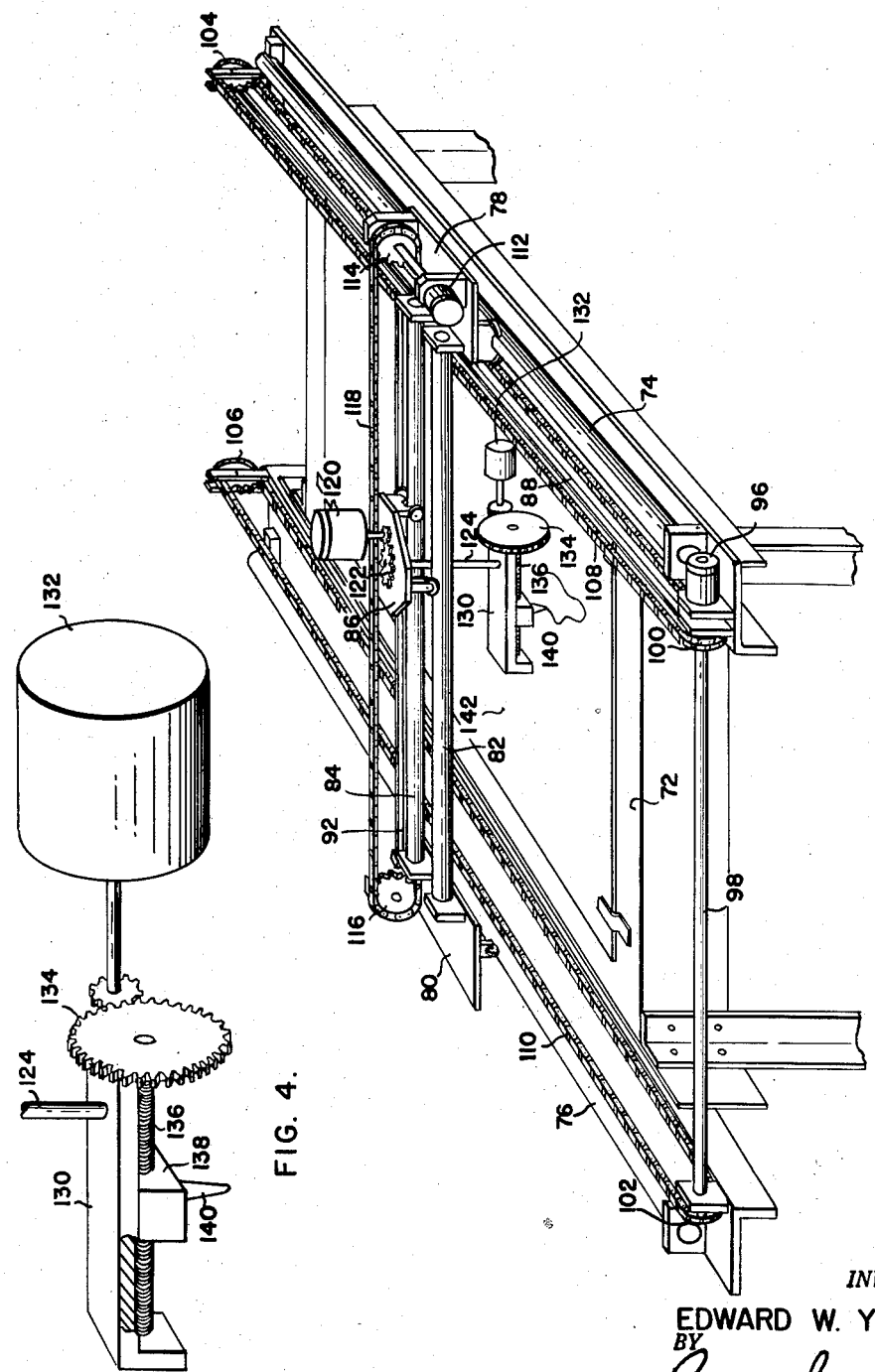

E. W. YETTER 2,858,978

RESERVOIR ANALYZER

Filed Sept. 9, 1952

INVENTOR.
EDWARD W. YETTER
BY

ATTORNEYS

Nov. 4, 1958 E. W. YETTER 2,858,978
RESERVOIR ANALYZER
Filed Sept. 9, 1952 8 Sheets-Sheet 4
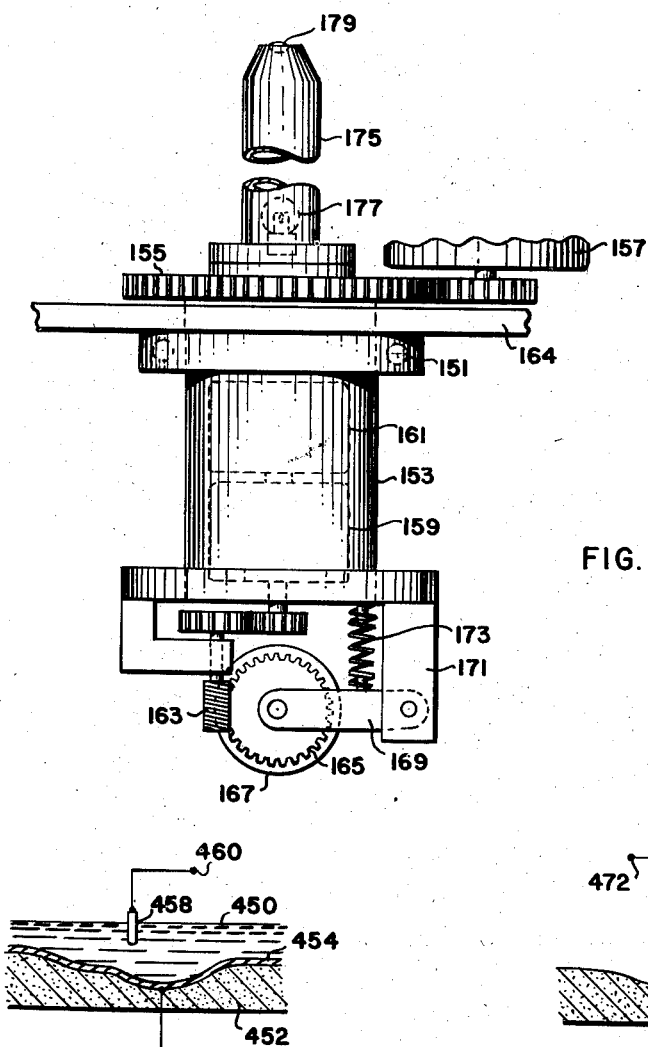
FIG. 6.
FIG. 14.
FIG. 15.
FIG. 16.
INVENTOR.
EDWARD W. YETTER
BY
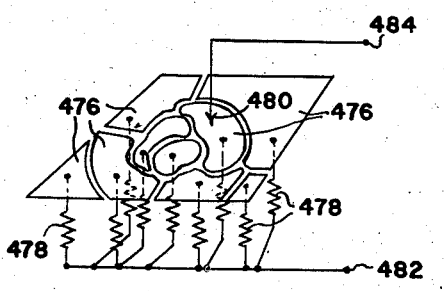
ATTORNEYS Nov. 4, 1958  E. W. YETTER  2,858,978
RESERVOIR ANALYZER Filed Sept. 9, 1952  8 Sheets-Sheet 5

INVENTOR.
EDWARD W. YETTER
BY
ATTORNEYS

Nov. 4, 1958     E. W. YETTER     2,858,978
RESERVOIR ANALYZER

Filed Sept. 9, 1952     8 Sheets-Sheet 6

INVENTOR.
EDWARD W. YETTER

ATTORNEYS

Nov. 4, 1958     E. W. YETTER     2,858,978
RESERVOIR ANALYZER

Filed Sept. 9, 1952     8 Sheets-Sheet 7

FIG. II.

INVENTOR.
EDWARD W. YETTER
BY
Busser, Smith & Harding
ATTORNEYS

Nov. 4, 1958 — E. W. YETTER — 2,858,978
RESERVOIR ANALYZER
Filed Sept. 9, 1952 — 8 Sheets-Sheet 8

INVENTOR.
EDWARD W. YETTER
ATTORNEYS

United States Patent Office 2,858,978
Patented Nov. 4, 1958

2,858,978

RESERVOIR ANALYZER

Edward W. Yetter, Chadds Ford, Pa., assignor to Sun Oil Company, Philadelphia, Pa., a corporation of New Jersey Application September 9, 1952, Serial No. 308,583

35 Claims. (Cl. 235—61)

This invention relates to a reservoir analyzer and has particular reference to an analog of an oil or gas reservoir and measuring apparatus associated therewith, though as will become apparent the invention is of more general application.

It is well recognized that, taking advantage of the similarity of equations relating to flow of fluids in subsurface reservoirs and relating to the flow of currents, that electrical analogs of fluid reservoirs may be constructed and by measurements of their characteristics the flows occurring in actual reservoirs may be predicted. As an example of such an analog reference may be made to the application of Omar L. Patterson, Serial No. 130,270, filed November 20, 1949, now Patent No. 2,727,682. As pointed out in that application, Darcy's law governing flow conditions in a fluid reservoir is analogous to Ohm's law governing current flow in electrical systems and consequently a corresponding relationship may be set up between an electrical analog and a given fluid reservoir. In said Patterson application the analyzer which is provided takes into account both time and space conditions in a reservoir. The space analog of the reservoir is, in that analyzer, energized through external circuits corresponding in particular to a water drive, in such fashion that variations of pressure conditions, and consequently of flow conditions, may be determined in the analog for particular times with the end object of predicting corresponding conditions in the actual reservoir. Electrical transients are utilized for these purposes, in particular, the transient being repeatedly established so that rapid and accurate measurements may be made.

It has been found, however, that an analyzer of the type disclosed in said application may be substantially simplified by disassociating spatial and time conditions. In brief, the time conditions may be given by what may be called a time model in which the withdrawal or injection of fluid may be simulated by a single current withdrawal or injection terminal, which amounts to providing a single fictitious well for the group of wells which may actually exist in the reservoir. In such a model there may, of course, be several current withdrawal or injection terminals each of which may represent one or more actual wells. Time models of this general character are described in the applications of Omar L. Patterson, Serial Numbers 196,480, now Patent No. 2,788,938, and 239,279, filed respectively November 18, 1950, and July 30, 1951.

Such a time model will give results in terms of total production or of a group of partial productions from a complete reservoir. However, it is also generally desirable to obtain a space picture of the reservoir conditions at various times, and for this purpose there may be provided a space model involving what amounts to an electrical map of the reservoir in which individual wells are geographically spaced in scaled simulation to the wells of the actual reservoir and electrical conductivity conditions are established in the region of the well electrodes so as to give simulation of the fluid field, controlled currents being introduced or withdrawn through the well electrodes. Utilizing such a model, it may be considered that for each particular electrical configuration thereof it represents conditions in the reservoir at a predetermined time just as if, at such time, the existing conditions could be held constant for measurement purposes. Thus, assuming that a time analog had been operated to give a picture of average pressure conditions in the withdrawal region of a reservoir and with establishment of total production at a particular time, those results may be transferred to the space model and, utilizing that model, measurements may be made to determine local conditions in the reservoir as of that time. Following such measurements, there may then be provided, by adjustment of potential and current conditions in the space model, conditions corresponding to another time, and local space measurements may be repeated. Conversely, it may happen that measurements utilizing the space model may indicate the necessity for some readjustments of the associated time model and by suitably repeated measurements there may then be predicted the conditions existing not only in time but in space for the reservoir through an extended future period.

While a space model may thus be associated with a time model, the utility of a space model of a reservoir is not limited to such association, but, as will more clearly appear hereafter, a space model may be utilized independently of a time model and by successive measurements there may be indicated by it alone time variations in spatial conditions in the reservoir.

The general object of the present invention is to provide a space analog which in particular embodies features of automatic operation to facilitate the making of measurements. Specifically, in accordance with the invention, equipotential and flow lines of fluid may be determined, measurements of pressure gradients made, and there may also be made determinations of conditions existing in a reservoir in which, for example, dry gas is injected to drive wet gas to producing wells, the field thus simulated being of the type known as a gas condensate field. In such a use, interest is directed primarily to determination of the boundaries between dry gas and wet gas at particular times. In accordance with the invention an analog is provided and operated to plot so-called sweep lines or isochrons which represent positions of the dry gas-wet gas boundary at different times.

As will become apparent hereafter, the analog provided in accordance with the invention is not limited in its utility to the analysis of reservoir conditions. It can be utilized, for example, for determination of electron flow conditions in vacuum tubes or the like in which laws of flow of electrons obey laws analogous to those involved in flow of current in a material medium.

Various subsidiary objects of the invention relate to advantageous details of the apparatus, for example the automatic positioning of probes, styluses or the like, the accurate control of current flow through electrodes, which in the case of a reservoir analog, correspond to wells, and the like.

These and other objects of the invention particularly relating to details of construction and operation will become apparent from the following description read in conjunction with the accompanying drawings in which:

Figure 1 is a perspective view showing diagrammatically a space analog or model for a reservoir;

Figure 2 is an enlarged perspective diagram showing a probe assembly involved in the model constituting Figure 1;

Figure 3 is a perspective diagram of a plotting board on which, as will appear, curves may be automatically drawn to give graphical measurements of conditions existing in the model;

Figure 4 is a perspective view showing an enlargement of the stylus drive illustrated in Figure 3;

Figure 6 is an elevation, with parts broken away, showing an automatic driver mechanism and a light spot projector mounted on the carriage of the driver board;

Figures 14, 15 and 16 are diagrams illustrating means for providing variable resistances as functions of geographical locations.

Figure 7:
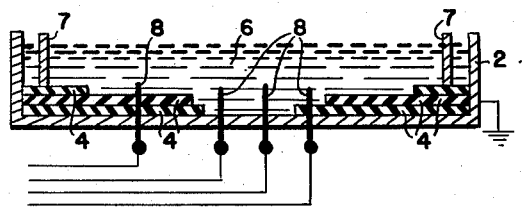
Figure 7 is a sectional diagram of the tank constituting the space model of the apparatus of Figure 1.
Figure 8:
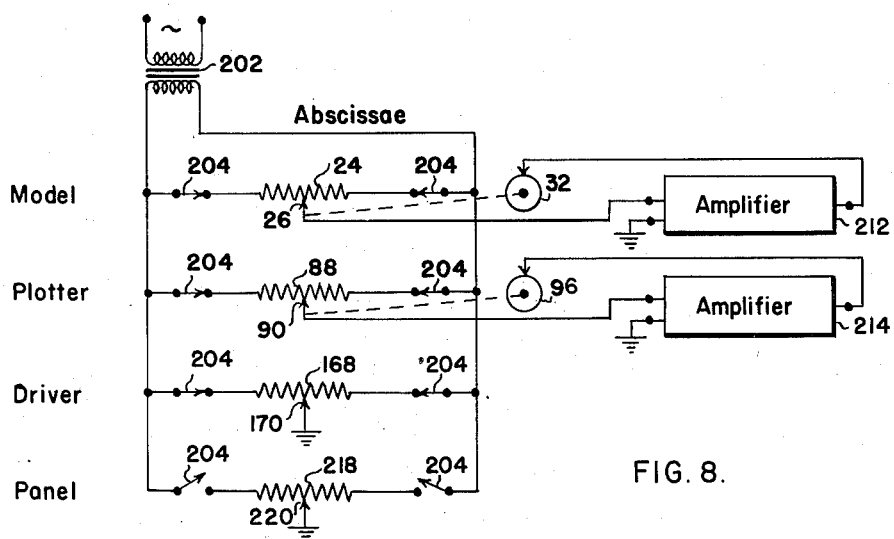
Figure 8 is a wiring diagram showing the electrical apparatus involved in the automatic establishment of corresponding abscissae in the several devices of Figures 1, 3 and 5.
Figure 9:
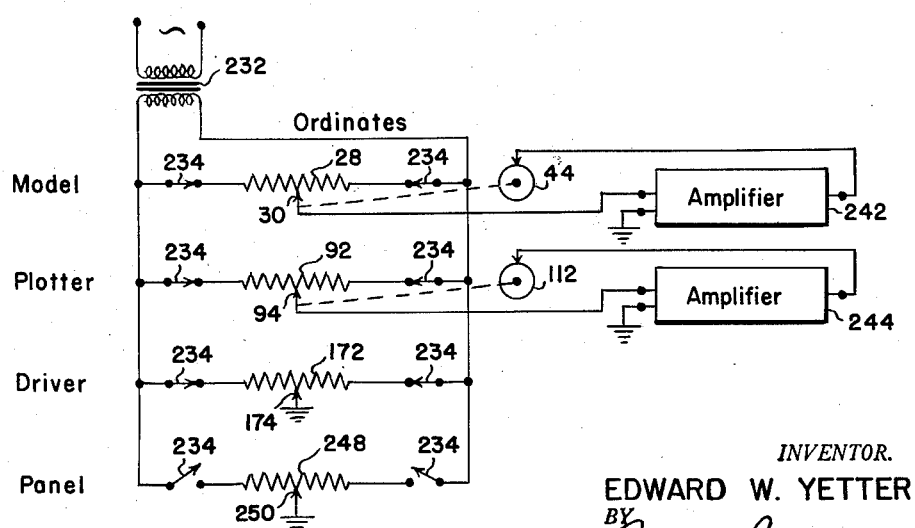
Figure 9 is a similar wiring diagram showing the electrical apparatus for establishment of corresponding ordinates in the same devices.

Referring first to Figure 1, there is shown therein the geometric analog of a fluid reservoir which comprises the tank 2 the bottom of which is contoured by means of sheets 4 of insulating material which serve to provide a suitable variation in depth of a conducting liquid 6 located in the tank. The upright walls forming the sides of the tank 2 may be conductive but, if desired, a conductive boundary for the liquid 6 may be provided by some other metallic contour (e. g. 7 in Figure 7) or element which will serve to provide a reference electrode which may be grounded. In what follows it will be assumed that the upright sides of the tank are grounded to provide the reference. The liquid 6 may be of any suitable conductivity to correspond to the reservoir conditions and thus provide a proper analogy between the reservoir and the model. Projecting upwardly through the bottom of the tank and the contouring members 4 are electrodes 8 which simulate wells. These well electrodes are located in horizontal relationships corresponding to the geographical locations of the wells. Extending along the sides of the tank 2 are fixed tracks 10 and 12. These tracks may consist of tubes on which move the carriages 14 and 16, each of which is provided with rollers engaging the tracks. The carriage 14 is provided with three rollers, while the carriage 16 is provided with two rollers. The rollers associated with carriage 14 prevent lateral displacement thereof relative to track 10. The carriages 14 and 16 are rigidly joined by movable tracks 18 and 20 on which there is guided a movable carriage 22. Extending parallel with track 10 is a fixed potentiometer wire 24 engageable by a contact 26 carried by the carriage 14. Supported by the carriages 14 and 16 in parallelism with the movable tracks 18 and 20 there is a potentiometer wire 28 which is engaged by a contact 30 carried by the carriage 22. (Contacts 26 and 30 are shown in Figures 8 and 9 only.)

The assembly of the carriages 14 and 16 and tracks 18 and 20 is arranged to be moved along the fixed tracks 10 and 12 in such fashion that the tracks 18 and 20 are constantly at right angles to the tracks 10 and 12. This is accomplished through the medium of a motor 32 which through suitable reduction gearing (not shown) drives a shaft 34 mounted in the supporting frame and carrying sprockets 36 and 38 over which and associated idlers 37 and 39 there are trained precision chains 40 and 42 which are respectively connected to the carriages 14 and 16.

Movement of the carriage 22 along tracks 18 and 20 is effected by a motor 44 which through reduction gearing (not shown) drives a sprocket 46 over which an idler sprocket 48 there is trained the precision chain 50 which is connected to carriage 22. By virtue of the arrangements just described, the mutually rectangular motions which have been mentioned are produced and the respective potentiometer contacts 26 and 30 are traversed along the respective wires 24 and 28.

Mounted in the carriage 22 is a vertical shaft 56 which is driven by a motor 52 through reduction gearing 54. The lower end of this shaft 56 mounts an insulating head 58 which supports a group of probes illustrated particularly in Figure 2, which probes dip into the liquid 6. One of these probes 60 is in axial alignment with the shaft 56 and will be hereafter referred to as the equipotential measuring probe. A pair of probes 62 and 63 are mounted symmetrically with respect to the axis of shaft 56 and constitute gradient measuring probes, each being spaced a definite distance from the axially extending probe 60. Arranged in right angular relationship to the line of probes 62, 60 and 63 and diametrically opposite probe 60 are probes 64 and 66 which are equally spaced from the probe 60 and together constitute equipotential alignment probes. These various probes are connected to flexible conductors which are not illustrated. Mounted on the carriage 22 is a helical potentiometer wire 68, diagrammed in Figure 10, which is concentric with the shaft 56 and is arranged to be engaged by a contact 70 carried by the shaft. The helical arrangement is provided so that the wire may subtend more than 360°. It has been found convenient to have it subtend three complete turns.

Referring now to Figure 3, there is provided a plotting board 72 provided by a transparent glass sheet which corresponds in its dimensions to the tank 2, but as will be evident may be to a different scale, generally desirably less than that of the tank to conserve space. A track and carriage arrangement is provided in connection with this board similar to that provided in association with the tank. This arrangement comprises the fixed tracks 74 and 76, respectively mounting the carriages 78 and 80, rigidly connected by the movable tracks 82 and 84 which in turn mount a carriage 86 for movement at right angles to the tracks 74 and 76 along which the carriages 78 and 80 are traversed. A fixed potentiometer wire 88 is engaged by contact 90 carried by the carriage 78, the potentiometer wire being arranged parallel to the track 74. A potentiometer 92 arranged parallel to tracks 82 and 84 is engaged by contact 94 mounted on carriage 86. These potentiometers and contacts are diagrammed in Figures 8 and 9.

A motor 96 driving through reduction gearing a shaft 98 provided with sprockets 100 and 102 serves for the driving of precision chains 108 and 110 which are trained about idler sprockets 104 and 106. A motor 112 drives through suitable reduction gearing a sprocket 114 over which is trained the precision chain 118 supported by the idler sprocket 116 and connected to the carriage 86.

A motor 120 drives through reduction gearing 122 a shaft 124 vertically mounted in the carriage 86 and carrying at its lower end a bracket 130 which mounts a screw 136 arranged to be driven by a motor 132, also mounted on the bracket, through reduction gearing 134 to traverse a block 138 which is formed as a nut for screw 136. A pen 140 or other suitable stylus is carried by the block 138 and is arranged to move in a vertical plane through the axis of shaft 124. As will become apparent hereafter, this pen has a deviation from the axis of shaft 124 which under certain conditions of operation of the apparatus is proportional to the gradient measured between the probes 62 and 63. A helical potentiometer 126 is arranged concentric with the shaft 124 and is engageable by a contact 128 carried by this shaft, this potentiometer being similar to potentiometer 68 in having a plurality of turns. (See Figure 10.) A potentiometer wire 146 is mounted parallel to screw 136 and is arranged for engagement by a contact 144 carried by block 138. (See Figure 11.) A translucent sheet 142 may be affixed to the glass sheet 72 to receive markings by the pen 140. The pen 140 normally clears the paper and is moved into engagement with the paper to draw lines or make dots by electromagnetic means (not shown) of conventional type under push button control by an operator.

As will be evident from what has just been described, the carriage arrangements and the arrangement of shaft 124 in Figure 3 are analogous to the corresponding carriage arrangements in Figure 1 and the arrangement of shaft 56. The shaft 124 will under usual conditions of operation have at all times positions corresponding to the shaft 56 both from the standpoint of rectangular coordinates and angular position, though, as will later appear, a relative shift of 90° between these shafts is sometimes involved. The direction of the fixed tracks 10, 12, 74 and 76 may be considered parallel to an axis of abscissae while the movable tracks 18, 20, 82 and 84 may be considered parallel to an axis of ordinates.

Figure 5:
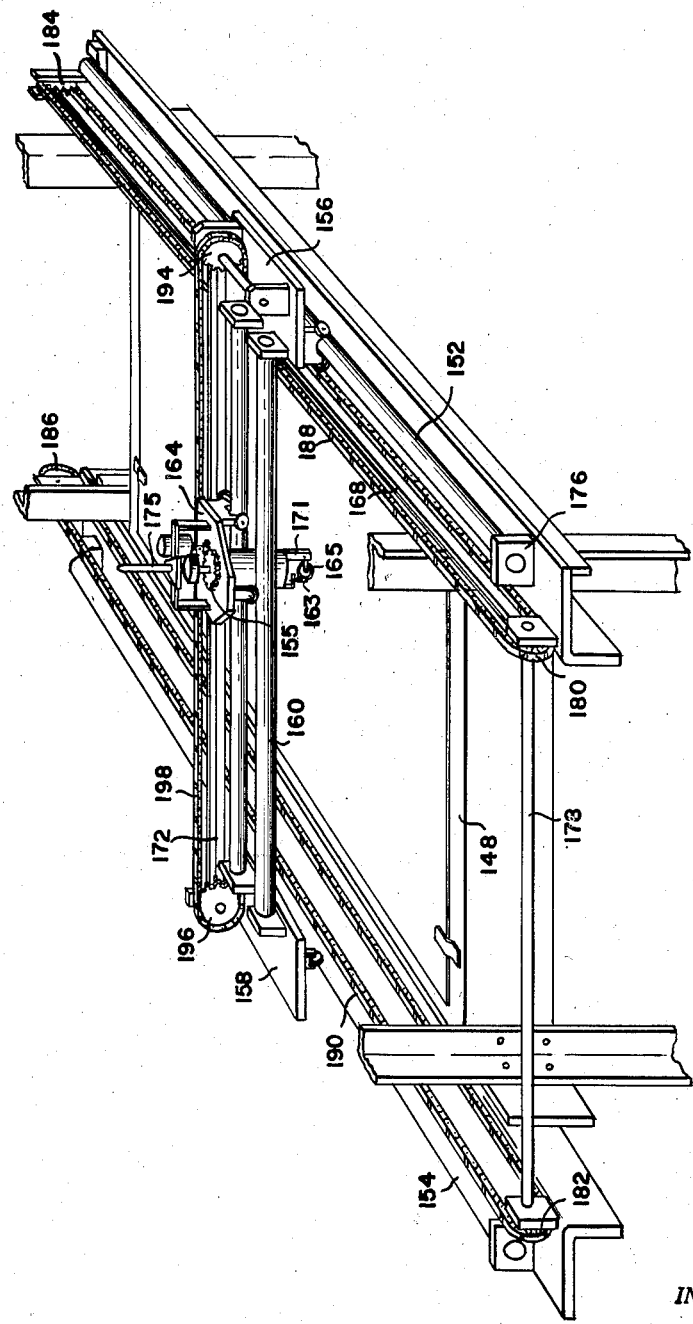
Figure 5 is a perspective diagram of a driver board associated with the apparatus shown in Figures 1 and 3.

Figure 5 shows an arrangement, which will be referred to as the "driver," and which is similar to that of Figure 3, and is located directly below it, comprising the board 148, fixed tracks 152 and 154 extending in the direction of the axis of abscissae, carriages 156 and 158 movable on these tracks and rigidly joined by movable tracks 160 and 162 supporting the movable carriage 164. A fixed potentiometer wire 168 is engaged by contact 170 carried by the carriage 156 while a movable potentiometer wire 172 carried by the assembly including carriages 156 and 158 is engageable by contact 174 supported by carriage 164. (See Figures 8 and 9.)

The carriage 164 is not, as in the cases of Figures 1 and 3, driven in the coordinate directions by individual coordinate motors, but to insure parallelism of the assembly including the carriages 158 and 156 there are provided precision chains 188 and 190 which are trained over sprockets 180 and 182 carried by a shaft 178, there being provided for these chains additionally the idler sprockets 184 and 186. Drive of the carriage 164 is effected by the mechanism particularly illustrated in Figure 6.

The carriage 164 supports in a bearing 151 a cylindrical member 153 to the upper end of which there is secured a gear 155 driven by a pinion on the shaft of a motor 157 mounted on the carriage. Rotational movements about its axis are thus imparted to the member 153. The member 153 provides a housing for a motor 159 the shaft of which also carries the armature of a generator 161. The shaft of the motor 159 drives through suitable reduction gearing a worm 163 which meshes with a wheel 165 secured to a shaft which also carries a traction wheel 167 arranged to make contact with the board 148 at a point which is in axial alignment with the member 153. The shaft of wheel 165 and traction wheel 167 is mounted in a lever 169 which is pivoted in a bracket 171 secured to the lower end of the member 153. A strong spring 173 urges the lever 169 downwardly to cause the traction wheel 167 to engage the board 148 under considerable force to insure good traction. The motor 159 always rotates in the same direction, and the threads on the worm 163 are arranged in such direction that the imparting of motion to this worm also urges the traction wheel downwardly into engagement with the board. An effective driving arrangement is thus provided.

The axis of the member 153 corresponds to the axes of shafts 56 and 124 of Figures 1 and 3, respectively. It has already been noted that the assembly shown in Figure 5 is located directly below that shown in Figure 3, and the carriage 164 supports a projector 175 arranged in the vertical axis of member 153 and adapted to project a spot of light on the translucent sheet 142 shown in Figure 3 in alignment with the axis of the shaft 124. This projection is effected through the use of a lamp 177 and a lens system indicated at 179, the lens moving directly below the glass sheet 72.

As will hereafter appear, the turning motor 157 and the traversing motor 159 are under either automatic or manual control during operation of the apparatus so that the path of movement of the carriage 164 is determined.

The physical aspects of the apparatus of Figures 1 to 7, inclusive, having been described, reference will now be made to the electrical connections whereby following and other characteristics of operation are secured. For convenience of reference the apparatus illustrated in Figure 1 will be referred to as the model, that of Figure 3 as the plotter, and that of Figure 5 as the driver. Additionally, reference will be made to a panel, by which will be understood a control apparatus which serves for certain manual adjustments and controls, though, generally speaking, the provision of such a panel is more a matter of convenience than of necessity. Reference will also be made to a manual steering control. One of the accomplishments of the apparatus is to maintain the carriages of the model, plotter and driver at corresponding abscissae and ordinates by which it is to be understood that the axes of shafts 56 and 124 and of member 153 are maintained in corresponding coordinate positions. In accomplishing this end, the position of the driver carriage, either automatically or manually attained, serves as the master determining coordinate positions which are then assumed by the model and plotter carriages. Further, an adjustment on the panel may be the master adjustment serving to position the model and plotter carriages. In addition the rotary elements of the driver and plotter are likewise caused to assume corresponding angular positions, at times corresponding to that of the member 56 of the model, or both of these rotary adjustments may be under control of a master panel adjustment.

Figure 8 illustrates the electrical connections involved in maintaining the model, plotter and driver in corresponding abscissae either under the control of the driver or under control of the panel. A transformer 202, energized from the conventional sixty cycle alternating power supply or otherwise, is provided with a secondary which supplies convenient potential through switches 204, which may be opened to cut various parts of the apparatus out of action, to the potentiometers 24, 88 and 168 previously described or to a potentiometer on the control panel indicated at 218 the contact 220 of which is manually adjustable. It may be here remarked that all alternating supplies to the apparatus are from the same source so as to secure fixed references for frequency, amplitude and phase. It will be apparent hereafter that phase relationships are particularly involved in matters of operation so that a common supply is important.

The potentiometer contacts 26 and 90 are adjusted along their potentiometer wires as their carriers are traversed by the motors 32 and 96, and contact 170 is adjusted along its wire with automatic or manual movement of carriage 164. The contacts 26 and 90 are accordingly diagrammed as driven mechanically by their motors 32 and 96.

The respective potentiometer contacts 26 and 90 provide inputs to the amplifiers 212 and 214 the nature of which will hereafter be described in detail. For the present it may be said that these amplifiers serve to control reversible operation of the respective motors 32 and 96 to effect balance of the bridges. The contacts 170 and 220 are grounded.

The operation of the abscissa circuit just described will be evident if it is considered that the various switches 204 have the positions illustrated in Figure 8. The driver constitutes a master for the control of the motors 32 and 96. It will be observed that the potentiometer 168 and, for example, potentiometer 24 constitute a Wheatstone bridge which will be unbalanced unless the contacts 26 and 170 are in corresponding positions. When the bridge is unbalanced, a signal of a phase corresponding to the deviation from unbalance will be delivered to amplifier 212 and produce operation of motor 32 in a direction to attain balance. When balance is attained, the contacts 26 and 170 will occupy corresponding positions. In similar fashion the contact 90 is also caused to follow the positioning of contact 170. If instead of having potentiometer 168 in the circuit, this potentiometer is removed and the panel potentiometer 218 substituted, the model and plotter positions will correspond to the manually set position of the contact 220.

As has been noted, Figure 8 represents an adjustment for abscissae only. An identical circuit shown in Figure 9 serves for corresponding control of ordinates of the carriages of the model and plotter. In this figure, transformer 232 corresponds to transformer 202. Switches 234 serve to connect the various potentiometers 28, 92 and 172 or 248 into the circuit, the potentiometer 248 being a panel potentiometer having a manually adjustable contact 250 which is grounded. The model contact 30 and the plotter contact 94 respectively supply inputs to the amplifiers 242 and 244 which, in turn, drive the motors 44 and 112. The contact 174 of potentiometer 172 is grounded. The operations of this circuit are the same as for that of Figure 8 and consequently need not be further described.

Figure 10:
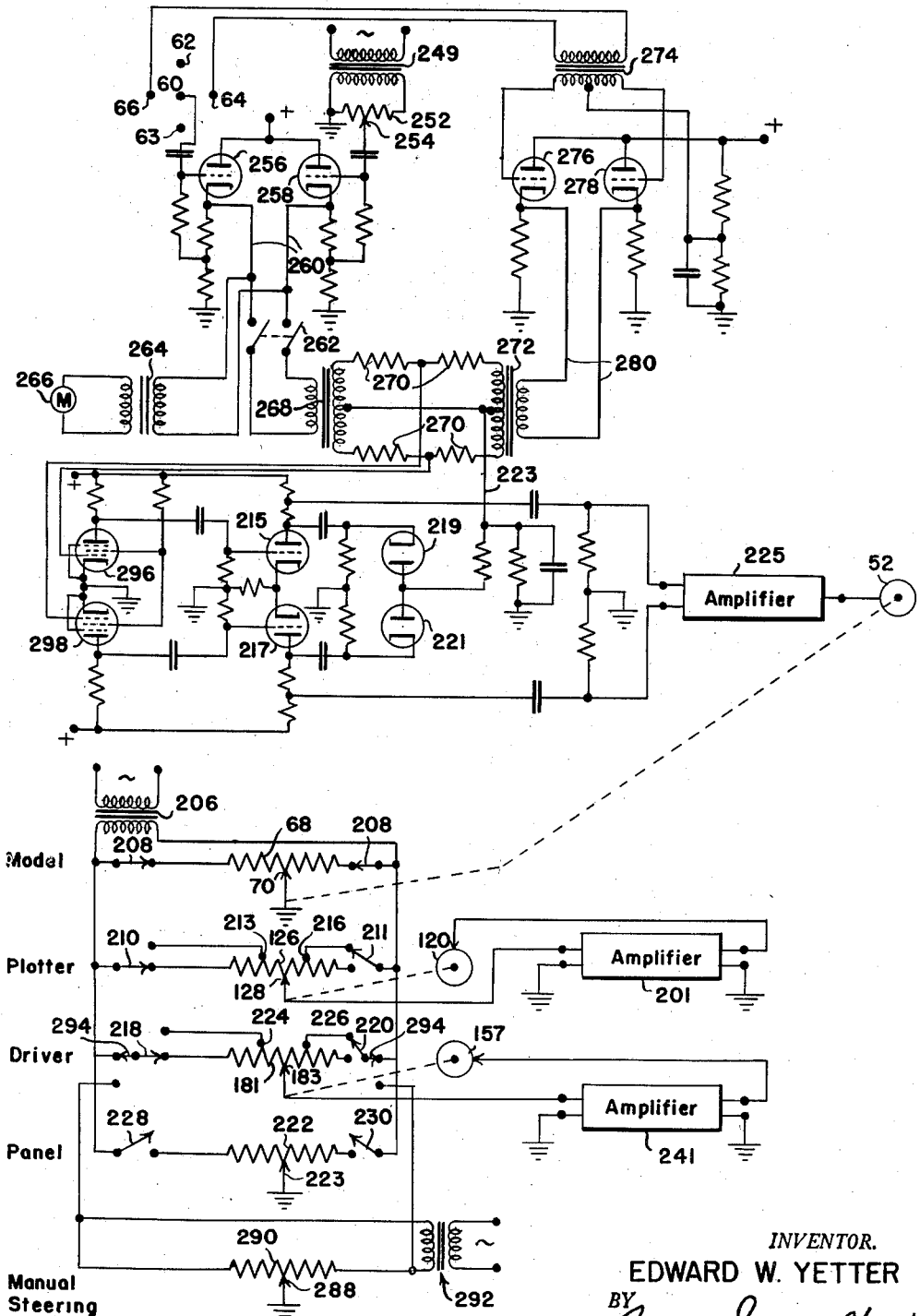
Figure 10 is a wiring diagram showing the electrical devices involved in establishing corresponding angular positions of the probe assembly in Figure 1, the stylus assembly in Figure 3 and the driver mechanism in Figure 5.

Reference may now be made to Figure 10 which shows the apparatus particularly involved in rotary control of the shaft 56 of the model and shaft 124 of the plotter. As will appear hereafter in the description of the overall operations involved in particular uses of the apparatus, various rotary control situations are involved. The apparatus of Figure 10 is arranged for securing different alternatives of control.

A transformer 206 energizes, in much the same fashion as has been described in connection with Figures 8 and 9, various potentiometer resistances which in association constitute Wheatstone bridges. The potentiometer 68 of the model, potentiometer 126 of the plotter and potentiometer 181 of the driver are energized along with a panel potentiometer 222 the contact 223 of which is grounded, this energization of potentiometer 181 from transformer 206 requiring that switches 294 be in their upper positions. Switches 208 selectively connect potentiometer 68 into the circuit. Its contact 70 is grounded.

The shaft of the plotter is required under certain conditions to assume variable angular positions corresponding to those of the shaft of the model, but under different conditions one of these shafts must be maintained in positions shifted 90° with respect to the other. In order readily to secure this condition, the potentiometer resistance 126 is of helical form and has several turns about the shaft 124, the contact 128 being carried by the shaft. In order to provide for the 90° relative shift of shafts 124 and 51, the potentiometer 126 is tapped at 213 and 216 so that by selective operation of switches 210 and 211 either a left-hand portion or a right-hand portion of the complete potentiometer may be placed in the circuit. The taps are so chosen that when the switches are moved from one position to the other a shift of 90° will result. The contact 128 of potentiometer 126 supplied the input to the amplifier 201 which in turn serves to drive reversibly the motor 120.

The driver potentiometer 181 is similarly tapped at 224 and 226 to provide for a 90° relative shift between the shaft 56 and the member 153, the switches 218 and 220 being provided to select the alternative positions. The contact 183 of potentiometer 181 is connected to the input of amplifier 241 which drives the motor 157.

As indicated in the diagram, the contact 183 is driven, effectively, by the motor 157, being connected to member 153. With switches 294 in their upper positions, the model is the master for the rotary settings of both the plotter and driver.

Referring now to the upper portion of Figure 10, a transformer 249 supplies current to a potentiometer 252 having a manually adjustable contact 254. A pair of cathode followers, including triodes 256 and 258, are respectively fed from the potential electrode 60 and the contact 254 and provide an output corresponding to the difference of potentials of these two inputs through lines 260 to the primary of a transformer 264, the secondary of which feeds a meter 266 the readings of which will correspond to the difference of potential existing between probe 60 and contact 254. The meter is used as a null indicator of equality of potential of contact 254 with that of probe 60, whereupon the potential of the probe may be read from a calibrated scale on potentiometer 252.

For automatic operation it is required that the probe 60 should assume a position at which its potential has a definite value corresponding to that set by the contact 254 on potentiometer 252. The difference of potential from the cathode followers is accordingly fed through switch 262 to the primary of a transformer 268 which in association with the transformer 272 and resistances 270 connected between the secondaries of these transformers provides a bridge arrangement.

The equipotential probes 66 and 64 are connected to the primary of a transformer 274 which supplies an input to cathode followers comprising the triodes 276 and 278, the differential output of these followers being delivered through lines 280 to the primary of transformer 272.

The output from the bridge arrangement including the resistances 270 is delivered from the electrical centers of the resistance array to the control grids of a pair of pentodes 296 and 298 constituting along with the triodes 215 and 217 a two-stage amplifier. The output from the anodes of the triodes 215 and 217 is delivered to the cathodes of diodes 219 and 221, the anodes of which are connected together and through connection 223 to center taps of the secondaries of transformers 268 and 272. The arrangement thus provided constitutes an automatic gain control which operates in conventional fashion to suppress the amplification of strong signals and provide maximum amplification of weak signals. Such automatic gain control is highly desirable since the gradients encountered in any model vary between wide limits, affecting the sensitivity and damping of the rotating system. The automatic gain control allows use of high sensitivity in regions of low gradient, but lowers gain in regions of high gradient so that the damping system is still able to prevent hunting.

Outputs from the anode circuits of triodes 215 and 217 are fed to an amplifier 225 which controls reversible operation of motor 52.

There will first be considered in connection with Figure 10 the operations involved in automatic following of an equipotential in the tank of the model. With the switch 262 closed, it will be noted that the inputs supplied to the bridge comprising the resistances 270 are two-fold: an input through transformer 268 corresponds to the difference of potential between the center potential probe 60 and the contact 254; while an input through transformer 272 corresponds to the difference of potential between the equipotential probes 64 and 66. If the former input were missing, the signal representing the difference of potential between the equipotential would supply an output from amplifier 225 which would drive the motor 52 in such direction as to align the equipotential probes along an equipotential passing through the central probe 60. As will hereafter appear, when it is desired to cause automatic tracking of an equipotential, the plane of tracking wheel 167 will be in the plane of, or corresponding to, the probes 64 and 66. If, therefore, under the conditions assumed, the wheel 167 were driven, the result would be motion approximately tangent, at the beginning of the motion, to the particular equipotential which happened to pass through the position of probe 60 after alignment of probes 64 and 66 on an equipotential was obtained. Obviously, however, the continued path of movement would be rather indefinite and probably a spiral type of path would be traversed. However, with the additional provision of a signal from the probe 60, assuming a difference of potential of this probe from that set by potentiometer 254, there will be superimposed on the position attempted to be determined by the location of the equipotential probes an angular deviation from their alignment on an equipotential. As will be evident, with proper relative circuit connections, this deviation may be in such direction as to tilt the line of the equipotential probes, and the plane of the wheel 167, in such direction that movement due to rotation of wheel 167 will cause the driver carriage to move in such direction as to approach the equipotential having the value of the potential represented by the position of contact 254. The result, therefore, is to cause movement toward the chosen equipotential. When that equipotential is reached, the signal representing the difference of potential between probe 60 and contact 254 will disappear, and the equipotential probes 64 and 66 will be aligned on the equipotential. As further movement takes place, any deviation of probe 60 from the chosen equipotential will appear as a turning signal to change the movement back toward the equipotential. The result then is initial approach to the chosen equipotential along a path which reaches it approximately tangentially, and then further movement is constrained along the equipotential resulting in accurate tracking of the same. The angular positioning of the plane of the wheel 167 to correspond to the angular position of the probes is, of course, effected through the Wheatstone bridge arrangement which has been described which causes the plotter shaft 124 and the member 153 to assume at all times positions corresponding to the angular position of shaft 56.

The circuit also provides for the automatic following of orthogonal trajectories, i. e. flow lines, of the equipotential contours. This action will be described in greater detail hereafter, but it may be here noted that to secure this result the signal from the probe 60 is eliminated by the opening of switch 262, so that the sole signal controlling the output of amplifier 225 is from the equipotential probes 64 and 66, the result being to maintain the alignment of these probes along equipotentials which, in the case of tracing of a flow line, will be successive equipotentials.

Under still other conditions as will hereafter appear, it is required that the carriages should be made to follow an arbitrary boundary but, at the same time, that the model and plotter shafts 56 and 124 should be located in corresponding positions such that the equipotential probes 64 and 66 constantly lie on equipotentials. Under these conditions the model is again the master controller for the plotter from the standpoint of angular positions of shafts 56 and 124, but the driver rotary positioning control is cut off from control by the model by the shifting of switches 294 to their lower positions.

The motor 157 now provides steering of the head 164 under manual control. This is accomplished through the provision of a potentiometer 290 having a manually controllable grounded contact 288. The potentiometer is energized from a transformer 292 similar to 206. The potentiometer is connected to the lower contacts of switches 294. Potentiometers 181 and 290 now constitute a bridge independent of the other bridge constituted by potentiometers 68 and 126, and accordingly the motor 157 is operated to cause contact 183 and member 153 to assume positions corresponding to those of contact 288 which becomes a steering control. The member 153 is thus rotated, and with concurrent control of the driving motor 159, the head 164 may be caused to follow any desired path. As will appear, the path which it is desired to follow will in general be a previously traced curve on the sheet 142, and the manual control consists in maintaining the spot of light projected by the projector 175 on the curve.

Figure 11:
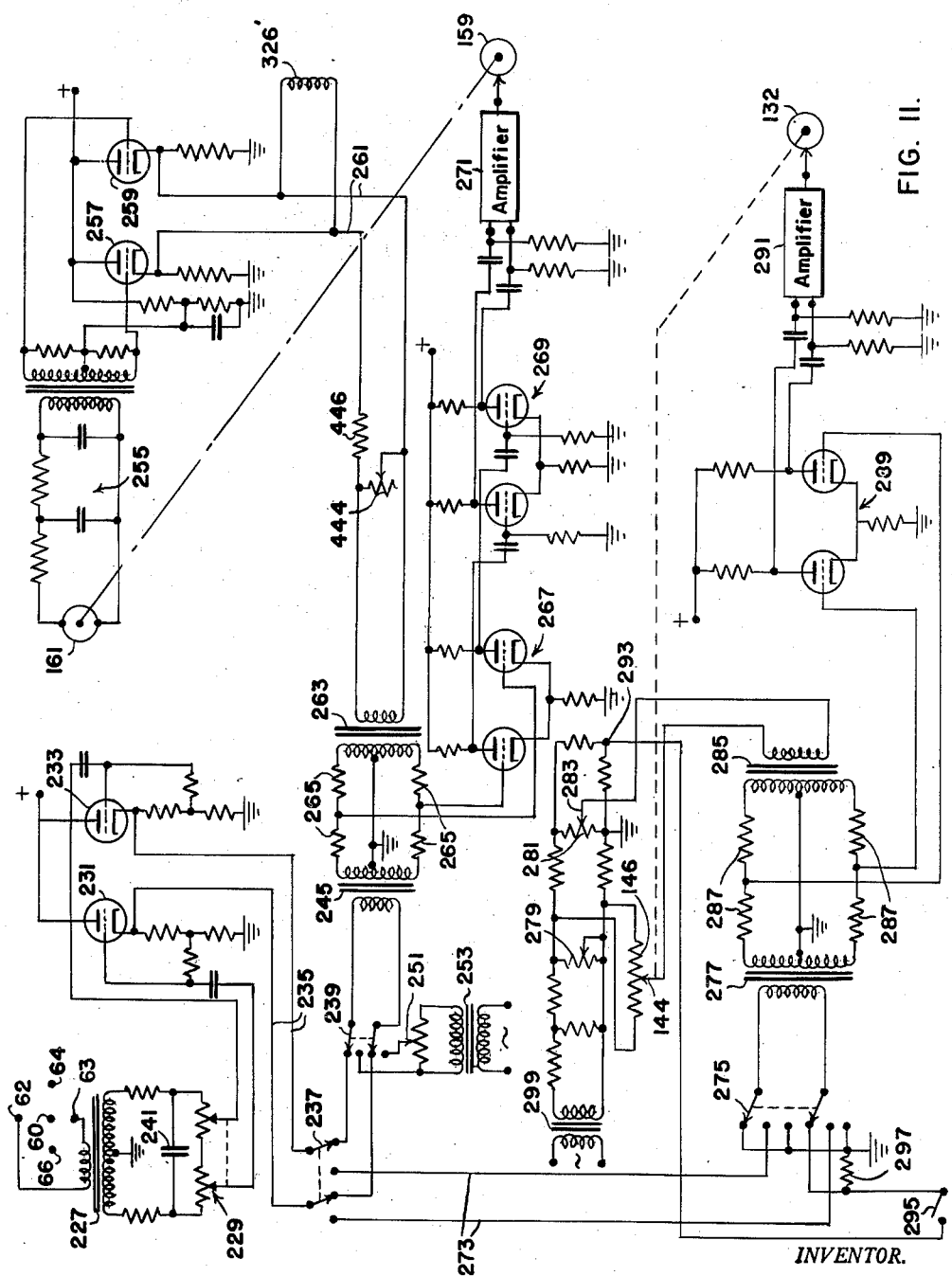
Figure 11 is a wiring diagram showing particularly the devices specially controlled in measurements and plotting of matters involving gradients.

Reference will now be made particularly to Figure 11 which shows the devices responsive primarily to the gradient as measured between probes 62 and 63. These probes are connected to the primary of a transformer 227 the secondary of which is connected to an adjustable resistance network indicated at 229, including a pair of ganged potentiometers, providing an input to the cathode followers including the triodes 231 and 233. A condenser 241 compensates for minor phase shifts in the circuit. The differential output from the cathodes of these cathode followers is delivered through lines 235 to the double-pole double throw switch 237. In the right-hand position of this switch it may be connected through another double-pole double throw switch 239 to the primary of a transformer 245 which is associated with another transformer 263 in a bridge-type network including the resistances 265. Alternatively, the primary of transformer 245 may be connected through switch 239 to the fixed and movable contacts of a potentiometer 251 which is energized through transformer 253. The contact 251 is manually adjustable and, as will appear, serves for manual control of the speed of motor 159. Conveniently, the contact 251 is moved by a foot pedal, while the contact 288 of potentiometer 290, Figure 10, is controlled by a rotatable knob, the result being speed and directional control rather similar to that of an automobile for causing the light spot from the projector 175 to follow a curve on sheet 142.

The generator 161 which is driven by motor 159 is connected through a phase-shifting network 255 and a transformer to the inputs of a pair of cathode followers comprising the triodes 257 and 259 in conventional circuits. The output from the cathodes of these triodes is delivered through lines 261 to the primary of transformer 263. This output is also delivered to the coil indicated at 326' which in the case of the amplifier driving the motor 159 takes the place of a coil 236 shown in Figure 12 and hereafter more fully referred to.

The output from the bridge arrangement of resistors 265 is fed through a pair of amplifiers indicated at 267 and 269 to a motor-driving amplifier 271 which serves to drive the motor 159.

The general operation of the portion of Figure 11 so far described may now be indicated. With the switches 237 and 239 in the illustrated positions, the bridge has two inputs, one corresponding to the potential gradient between probes 62 and 63 and the other corresponding to the output voltage of the generator 161. The generator 161 is of induction type having a pair of field coils one of which is energized from the common alternating current source while the other provides the output. A generator of this type has the characteristic that the output voltage is directly proportional to speed. The two signals delivered to the bridge provide an output which measures their difference and serves to control the speed of motor 159 so that the output voltage signal from generator 161 balances the gradient signal. The result, then, is that the motor 159 rotates at a speed directly proportional to the gradient potential appearing between probes 62 and 63 and consequently the carriage 164 is driven at a speed proportional to the gradient.

Under manual control, the adjustment of contact 251 provides the input to the bridge through transformer 245 and the speed is proportional to this input signal.

Continuing the description of Figure 11, the switch 237 in its left-hand position provides a signal proportional to the gradient through lines 273 to a pair of contacts of a double-pole triple-throw switch 275. The movable members of switch 275 have another position in which they are both grounded. In a third position one of them is grounded and the other is connected to one end of a resistance 297 the other end of which is grounded. The ungrounded end of this resistance 297 is connected through a switch 295 to a point 293 of a resistance network, the switch 295 being controlled by a clock so as to be closed periodically at equal suitable intervals of time to provide markings as will hereafter appear. The movable members of the switch 275 are connected to the primary of a transformer 277 which, together with a transformer 285, is connected into a resistance bridge having resistances 287. A transformer 299 energized from the alternating current source supplied a resistance network which includes a rheostat 279 and a potentiometer 281 having a movable contact 283 for zero adjustment. The point 293 previously referred to is provided by the junction of two resistors which shunt the potentiometer 281. Also shunting this potentiometer is the resistance wire 146 previously referred to, the movable contact 144 of which is connected to the stylus carrier 138. The signal appearing between contacts 144 and 283 is fed to the primary of the transformer 285. The output from the bridge is delivered through an amplifier 289 to the amplifier 291 which reversibly controls the stylus motor 132.

With the switch 275 arranged to provide the input from lines 273 to the bridge, the motor 132 is controlled, in accordance with the difference signal from the bridge, to cause the contact 144 to assume a position corresponding to displacement of the stylus 140 from axial alignment with shaft 124 to an amount proportional to the potential gradient appearing between probes 62 and 63. The scale factor between the displacement and the gradient is determined by the setting of the ganged potentiometers 229. Rheostat 279 is used to set the maximum sensitivity to a convenient value and to compensate for any drift over a period of time. Contact 283 is initially adjusted so that the stylus is in axial alignment with shaft 124 for zero gradient.

With the switch 275 in position to ground both of its movable elements, the stylus will be maintained in axial alignment with shaft 124. The same condition will exist when the contacts of switch 275 are moved to bridge the resistance 297 and the switch 295 is open. When, however, the switch 295 is periodically closed, there will be an input to the bridge through transformer 277 to produce a displacement of the pen from axial alignment. The result is that when a curve is drawn, the curve will include momentary lateral displacements which will serve as markings of the stylus position at equal intervals of time.

Figure 12:
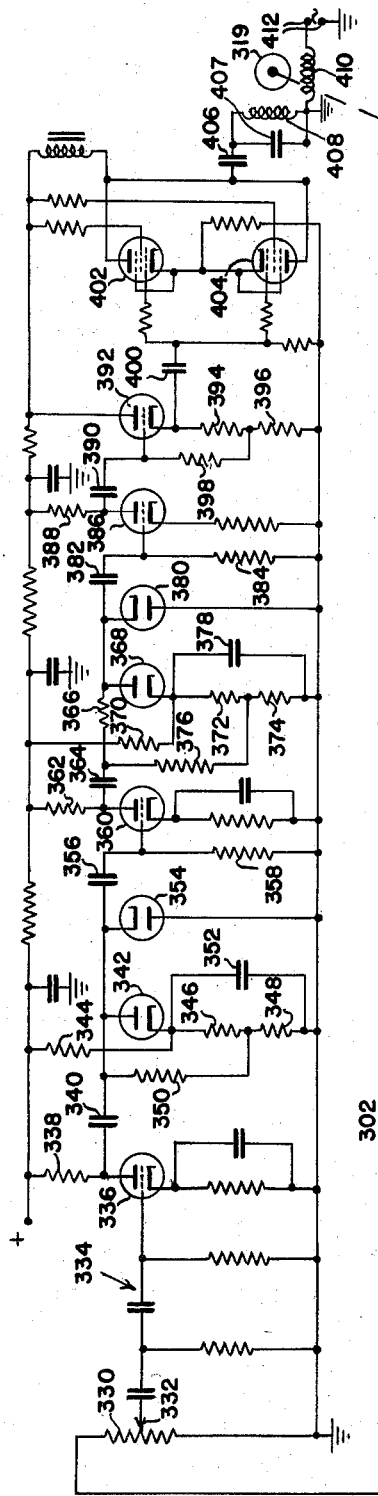
Figure 12 is a diagram showing, in particular, details of the amplifier and driving motor arrangements involved in Figures 8 to 11, inclusive.

While the motor-controlling amplifiers heretofore referred to may be of various types, there is indicated in Figure 12 a preferred form of such amplifier involving also a generator secured to the motor shaft and adapted to prevent hunting. Figure 12 may be considered as illustrative of all of the amplifiers 212, 214, 242, 244, 225, 241, 201 and 291. With minor modification, as hereafter indicated, it is also illustrative of amplifier 271.

The input terminals 300 of the amplifier are connected through a resistance network 302 to a primary winding 304 of a transformer which has a secondary winding 306. Terminals 308 are connected to the common alternating current supply line and supply through condenser 310 current to one field coil 314 of an induction generator which is diagrammatically indicated at 316. The condenser 310 is chosen to secure the desired phase of current through the field coil 314. The generator is provided with an output field coil 318 through which, when the generator is operating, current flows to a potentiometer 320 having an adjustable contact 322 in series with a resistor 324 and a second primary coil 326 of the transformer which carries the coils 304 and 306. The generator 316 is connected to the shaft of the motor 319 which corresponds to the various driven motors previously described. The arrangement is such that when one of these motors is operated the corresponding generator will provide an additional primary input to the transformer, which input will buck the input from the terminals 300 and will be proportional to the speed of the motor and will have a reversible phase depending upon the direction of rotation. The output from the generator 316 will, in general, be much less than the input to the terminals 300 except when the system is nearly balanced. As will later appear more clearly, the amplifier is so arranged that the effect of the generator input will be negligible except at the approach to balance.

In the case of amplifier 271, the circuit is slightly different: motor 159 corresponds to motor 319, but primary coil 326 and its connections are replaced by coil 326' and its connections, as shown in Figure 11.

The output from the secondaries 306 and 328 is fed to a potentiometer 330 the adjustable contact 332 of which connects through a phase-adjusting filter arrangement 334 to the grid of a triode 336 arranged as an amplifier with an anode load resistor 338 and providing an output through condenser 340. The output is subjected to limiting by the arrangement of the pair of diodes 342 and 354. The anode of the former is connected to the condenser 340 while its cathode is connected to the junction of resistors 344 and 346 of a series group including also the resistor 348 connected between a positive potential supply line and ground. A large condenser 352 is connected between the cathode of diode 342 and ground. A high resistance 350 is connected between the anode of diode 342 and the junction of the resistors 346 and 348. The cathode of diode 354 is connected to condenser 340 and its anode is grounded.

The arrangement of these diodes will be recognized as constituting a limiter for both positive and negative cycles of the input from condenser 340. The sinusoidal input wave is thus transformed into an approximately rectangular wave of symmetrical form. A still better approach to a rectangular wave is desired than is afforded by the single amplification by triode 336 and the action of the limiting diodes 342 and 354, and accordingly the approximately rectangular wave is fed through condenser 356 to a second amplifier comprising the triode 360 and the anode load resistor 362. The grid of triode 360 is connected to ground through resistor 358. The output of this second amplifier is delivered through condenser 364 to a further limiter comprising the diodes 368 and 380 in an arrangement similar to that previously described, there being provided between the anode of diode 368 and the cathode of diode 380 and the condenser 364 a resistor 366. The cathode of diode 368 is connected to the junction of resistors 370 and 372, which, in conjunction with a further resistor 374, are connected in series between the positive potential supply line and ground. The junction of resistors 372 and 374 is connected to the output side of condenser 364 through high resistance 376. A condenser 378 connects the cathode of diode 368 to ground. The anode of diode 380 is grounded. The output from the last mentioned limiter is delivered through condenser 382 as a symmetrical rectangular wave to a further amplifier comprising the triode 386 and a load resistor 388, which amplifier delivers its output through condenser 390 to a cathode follower arrangement comprising the triode 392 having between its cathode and ground the series arrangement of resistors 394 and 396, the junction of which resistors is connected through resistance 398 to the triode grid. This cathode follower provides drive through condenser 400 for the parallel arrangement of a pair of power pentodes 402 and 404 which supply through condenser 406 one of the fields 408 of the motor 319, the other field 410 of which is supplied with alternating current from the power source previously described at terminals 412.

The amplifier which has been described provides for high sensitivity of control of the driven motor with high rapidity of response and, nevertheless, suppression of hunting. The bridge which provides the input signal produces a reversal of phase of the input depending upon the direction of deviation from balance, and this signal, amplified and limited as already indicated furnishes current to the field 408 which current becomes compared in phase with that from terminals 412 with the result that the motor 319 is driven in the proper direction to secure balance of the bridge. The amplification is such that substantially irrespective of magnitude of the signal at terminals 300 the same input to the pentodes 402 and 404 is provided in the form of a rectangular wave of constant amplitude except upon close approach to balance. The input to the motor field 408, however, is sinusoidal due to the tuning action of condenser 407 shunting the field. The tuning condenser is desirable to raise the input impedance of the motor field, thus improving the impedance match to the amplifier, to eliminate harmonic currents to the motor field which contribute no useful power but produce heating, and to eliminate phase shift resulting from the inductance of the motor windings. So long as balance is not closely approached, the output of the generator 316 is substantially negligible compared to the input at terminals 300 and consequently the effect of the generator is not reflected in the input to the motor. When, however, balance is approached, the input at terminals 300 decreases and the bucking effect of the output from the generator is substantial in comparison with the error signal so that the input to the motor is substantialy decreased with the result of slowing down the speed of rotation or, in fact, of producing a signal which would reverse the rotation if overrun occurred. The effect of the generator on the system may be controlled at potentiometer 230, and with proper adjustment control may be effected such that the motor 319 operates at full speed almost to the point of balance and is then slowed down to reach balance with no hunting or, if desired with very slight oscillation and damping to and, about the position of balance. The signal from the generator of course, becomes zero when the motor stops.

In the case of motor 159, the connections as previously described, are such as to cause the speed of motor 159 to be proportional to the potential between the gradient probes, the connections at 326' preventing hunting about this speed.

It will be evident from the foregoing that very rapid following of the various moving devices occurs so that at practically all times corresponding positions of the movable elements are achieved as already indicated.

It is of importance to control current flow through the electrodes in the tank in such fashion that the amount of current which flows is independently established without regard to the potential of the electrode which will be dependent upon not only flow of current through it but all other flows in the electrolyte. Furthermore, it is important that the electrode current should have the same wave shape as the supply for all of the elements of the apparatus. Generally, this may be assumed to be sinusoidal and will be so assumed in the discussion which follows:

Difficulties with respect to wave shape arise because the contact between an electrode and an electrolyte is generally non-linear. In other words, if a sinusoidal potential is imposed across electrodes immersed in an electrolyte, the resulting current will not be sinusoidal but will have a wave shape more or less distorted depending upon the non-linearities existing in the system. But if a sinusoidal current flow is desired, there could be applied a suitable non-sinusoidal potential which, taking into consideration the nature of the non-linearities in the system, would cause a sinusoidal current to flow.

In accordance with the present invention, this type of result is achieved: the electrode potential is automatically so controlled that the current flowing through the electrode corresponds in wave shape to the alternating supply of the apparatus. Furthermore, the control arrangement is such that the current flow may be manually set and will be independent of the potentials which may exist at the electrode. The attainment of the results just indicated will be apparent from consideration of the electrode control circuit illustrated in Figure 13.

At 414 there is indicated a transformer supplied with current from the same alternating source as supplies the other elements of the circuit. This source will therefore have a uniform wave shape for all of the elements and this shape may be assumed to be sinusoidal. The transformer 414 has the center of its secondary grounded at 416 and the secondary supplies current to a potentiometer resistance 418 with which is associated a manually adjustable contact 420. As will appear, this arrangement provides for control of current flow through any electrode within limits and with possibility of reversal of its phase to correspond to withdrawal of fluid from a well or injection of fluid into a well.

Potentiometer contact 420 is connected through condenser 422 to the arrangement of a variable resistance 424 and a fixed resistance 426 in series to ground, and through the primary of a transformer 328 to the grid of a triode 430. The triode 430 is arranged in a conventional amplifier circuit including the load resistor 431 and the output of this amplifier stage is delivered to a second amplifier stage comprising the triode 432 and load resistor 434. The output from the anode of the triode 432 is delivered through a resistance 436 and condenser 438 to the corresponding well electrode 8. The ends of resistor 436 are connected as indicated at 440 to the primary of the transformer 428, to provide a feedback to the grid of the first triode 430.

Circuit constants are so chosen that, assuming zero input through condenser 422, a degenerative condition is produced which will suppress any current flow through resistance 436 and hence through electrode 8 originating anywhere except in the input to the grid of triode 430. It may be readily seen that this end can be achieved: any tendency of a potential to appear across resistance 436 will result in imposition through the amplifier of a bucking potential to substantially completely suppress the original assumed potential. The suppression is all the more complete as the gain of the amplifier is large, and the amplifier desirably should have a very high gain. A potential introduced through condenser 422, however, is algebraically added to the feedback that may exist through transformer 428, and accordingly will result in a predetermined current through resistance 436 and through the well electrode. It will be evident, however, that only a component of this current which is of the same wave shape as that introduced at 422 will exist through the resistance 436 and the well electrode. Any departure of that current from the introduced wave shape will appear as a component which does not originate at the input and will be suppressed just as if it occurred independently of the input. The result is that the current flow through the electrode is very precisely in correspondence as to wave shape with the input through condenser 422. Furthermore, it bears a definite amplitude relationship to this input depending upon the fixed constants of the amplifying and feedback systems. Accordingly there are achieved the desired results:

The current is highly independent of the potential conditions at the electrode which may depend upon other currents in the system resulting from independent control of other electrodes.

Secondly, results of the non-linear conditions above discussed are removed by virtue of the fact that the amplifier provides automatically any potential to the electrode 8 which may be required to maintain the current wave shape in correspondence with the input through condenser 422.

The setting of potentiometer contact 420 may be calibrated in terms of the current through the electrode, or if desired, the actual current flow may be indicated by a meter in series with the electrode.

Typical operations of the apparatus will now be reviewed.

The following of equipotential lines has already been generally indicated, but the various adjustments of the parts may be summarized as follows:

The stylus 140 will be aligned with the axis of shaft 124 by the grounding of the movable elements of switch 275 with potentiometer contact 283 set to secure accurate alignment. In the plotting of equipotentials, the angular position of the plotter arm 130 is immaterial.

Referring to Figures 8 and 9, the driver is the master for the model and plotter, controlling their carriages in rectangular coordinate positions. The switches 204 and 234 are accordingly in the positions illustrated.

Motor 159 will have its speed manually controlled by the positioning of contact 251, with switch 239 in its lower position.

In Figure 10 switch 262 will be closed. The bridge will receive signals from the central probe 60 and from the equipotential probes 64 and 66. The model will be the master to maintain the plane of the caster driving wheel 167 in line with the equipotential electrodes. Accordingly, switches 208, 218 and 220 will be closed, the latter in appropriate positions to secure the last mentioned relationship of the wheel 167 with the equipotential electrodes. Switches 294 will be in their upper positions. The plotter switches 210 and 211 may be open since the angular position of the plotter arm is immaterial.

With the adjustments made as described, and with the contact 254 on potentiometer 252 at a position corresponding to the potential value of the equipotential to be traced, as may be indicated by a meter between contact 254 and ground or by calibration of the potentiometer, automatic operation will take place which will first rapidly bring the probe 60 to the desired equipotential contour as already indicated (provided it is initially within a distance less than the spacing of the equipotential probes), and then the equipotential will be followed, providing on sheet 142 a curve corresponding to this equipotential traced by the stylus. In this fashion through additional adjustments of contact 254, a series of equipotential contours may be traced.

For the plotting of flow lines, which are orthogonals to equipotentials, the apparatus will be set and operated as follows:

The driver carriage is the master for the rectangular coordinate positions of the model and plotter so that the circuits of Figures 8 and 9 are adjusted as described for the plotting of equipotentials. Switch 262 will be opened with the result that the equipotential probes 64 and 66 will alone supply the bridge comprising resistances 270.

For rotary movements, the model is again the master. Switches 218 and 220 will be set so that the plane of wheel 167 is normal to the equipotential line through probes 64 and 66. Accordingly, motor 52 will position the shaft 56 which, in turn, through movement of contact 70 will turn the plane of wheel 167 through motor 157.

The plotter shaft 124 is turned, by positioning of switches 210 and 211, so that the line of movement of the pen is at right angles to the plane of wheel 167.

Contact 283 will be set for stylus centering when switch 295 is open, but the movable members of switch 275 will be located across the resistance 297 so that, with switch 295 periodically closing, lateral deviations from the plotted gradient will be made in the form of pips extending laterally from the plotted flow lines.

Switch 237 will be closed in its right-hand position and switch 239 will be in its upper position so that gradient signals are introduced from probes 62 and 63 to the bridge comprising the resistances 265, which bridge will also receive speed signals from the generator 161. The result is that the speed of motor 159 will be proportional to the gradient. Inasmuch as the plane of wheel 167 will be at all times normal to a line through the equipotential probes, the motion will be orthogonal to the equipotentials so that the flow lines will be properly traced. The marks at equal time intervals occasioned by closure of switch 295 will mark on the plotted flow line intervals which will be approximately proportional to the gradient in their vicinity. The scale factor involved is set by the positions of the contacts at 229.

The most important use of the equal time interval markings along the flow lines is the plotting of what may be called isochrons, particularly in the study of subsurface boundary movements. For example, in what is called a gas condensate field, dry gas is injected into certain wells to drive wet gas to producing wells. In such a field it is desirable to determine the position, from time to time, of the boundary between the wet and dry gas, remembering that this boundary is fairly well defined in practice by reason of the fact that both gases are filtering through porous media. The contouring of the tank gives resistance variations therein corresponding to resistances to flow of the gases and the flow will occur in correspondence with the flow of current in the electrical analog, with velocities of flow proportional to the potential gradients in the analog. Currents into and out of the electrodes will correspond to the flows of gas into the injection wells and from the producing wells. The isochrons referred to will represent the boundaries between the wet and dry gas at predetermined times.

To determine such isochrons, the electrode currents are set to correspond to the respective injection and producing rates at the wells which are represented by corresponding geographic positions of the well electrodes.

Operation is now carried out as above described, the flow lines being automatically plotted with equal time interval markings produced thereon. For isochron determination, all of the flow lines must originate, in the sense of zero time, on the same boundary which may be considered the boundary between the wet and dry gas at a zero time. This reference boundary may be assumed rather arbitrarily and, conveniently, may well be a small circle about one of the electrodes corresponding to an injection well. It is not particularly material what boundary is arbitrarily chosen so long as it is reasonably assumable close to a wet-dry gas boundary actually existing in the early part of the field history. Its errors in the direction of a flow line will merely be perpetuated as a constant error along the flow line. The desired isochrons may be drawn on the flow line plot by connecting the corresponding time marks on the flow lines, there being automatically plotted sufficient flow lines to provide the required time marks.

While isochrons may be most simply determined from a flow line plot as just described, they may also be automatically plotted, each from a previous isochron. This is more laborious but is advantageous under some conditions as a check, particularly a spot check, on the foregoing method.

For the automatic plotting of isochrons in this last mentioned fashion, it is required that, while a particular isochron is being followed, there should be drawn automatically an isochron corresponding to an additional constant time interval. The latter is plotted so that each of its points is spaced from a corresponding point of the former, in the direction of the gradient, by a distance proportional to the gradient. In the present apparatus the following of the first isochron is accomplished under manual control while the subsequent isochron is plotted automatically.

For rectangular coordinates, the driver is again the master for the model and plotter and accordingly the circuits of Figures 8 and 9 are set up and operate as before.

The direction and speed of movement of the driver is manually controlled and it may be noted that the direction of movement has no directly ascertainable relationship to the direction of equipotentials. Accordingly, the angular position of the driver is independent of that of the model and plotter. The direction of movement of the driver is controlled by motor 157 from the manual settings of contact 228, switches 294 being in their lower positions. This connects potentiometer 181 to potentiometer 290, these potentiometers being then independent of potentiometers 68 and 126 of the model and plotter, respectively.

Switch 262 is open so that motor 52 controlling the angular position of the electrodes is controlled solely from the signals of the equipotential electrodes. The arrangement is such that the equipotential electrodes are at all times maintained in alignment on equipotentials. The angular positions of the electrodes control the angular position of the shaft 124 of the plotter. Switches 210 and 211 are set so that the direction of movement of stylus 140 relative to the axis of shaft 124 is normal to the line joining the equipotential electrodes.

The stylus 140 is driven by motor 132 to a position away from the axis of shaft 124 which is proportional to the gradient. This result is secured by setting switch 237 to its left-hand position to make contact with the lines 273, while switch 275 also makes contact with these lines with the result that a gradient signal is introduced through transformer 277 into the bridge arrangement of resistances 287. Contact 144 of potentiometer 146 is driven with the stylus by motor 132 so that balance of the bridge is effected when the deviation of the stylus from the axis is proportional to the gradient. The scale factor involved is set by adjustment of the potentiometer contacts at 229.

If the isochrons are plotted automatically in this fashion starting without utilizing an isochron otherwise determined, there must be first assumed an arbitrary isochron as described above, for example, a small circle about an electrode corresponding to an injection well. However, the starting isochron may be one drawn through corresponding time marks on flow lines as above described.

The operator follows the initially assumed isochron or a subsequent isochron by maintaining the spot of light projected by 175 on that isochron through manipulation of the potentiometer contacts 251 and 288, the former controlling speed of motor 159 with the switch 239 in its lower position, and the latter controlling direction. For every point of the original isochron, the stylus 140 is then automatically positioned at a point which bears to the first point a direction corresponding to that of the gradient, i. e. normal to an equipotential, and at a distance proportional to the gradient. The new isochron thus produced gives the position of the gas-gas boundary after an interval determined by the fixed scale factor. By repetitions of this procedure a series of isochrons will be produced representing successive positions of the gas-gas boundary. The same procedure may then be repeated for every other injection well and thus a complete map may be made indicating the various boundaries at various times.

From a study of an isochron map produced in accordance with either described method, decisions may be made as to the timing of injections, rates of injection, and the like, to produce the maximum recovery of wet gas. It may be noted that rates of injection or production may be changed from time to time and these changes may be simulated by changes of currents caused to flow through the well electrodes.

Under various conditions it may be desirable to apply correction factors in the circuits already described which factors are variable with geographical locality. As an example, to take into account various inhomogeneities in the reservoir, it may be desirable to modify either the pen deflection amplitude or the drive motor velocity in accordance with local conditions. For such purposes, it would be desirable to have, for example, the resistance at 279, Figure 11, automatically adjustable, or to adjust the input to transformer 263 by adjusting a variable resistance 444 associated with a fixed resistance 446 so as to take a variable portion of the output from the cathodes of triodes 257 and 259. In fact, other factors in the circuits may also be subject to such variations or corrections. For this purpose there may be utilized one of the arrangements illustrated in Figures 14, 15 and 16 which show alternatives capable of providing adjustable resistances in correspondence to variable geographical locations.

Referring first to Figure 14, there is shown therein an electrolyte 450 contained in a tank 452 having a conducting bottom 454 connected to a terminal 456. An electrode 458 is connected to a terminal 460. If the tank has a corresponding area to that of the main electrolyte tank and is properly contoured, and if electrode 458 is mounted on a carriage similar to carriage 22 and similarly driven in rectangular coordinates, rotation being unnecessary, it will be evident that there will be provided, due to the resistance of liquid 450, between the terminals 456 and 460 a variable resistance which is a function of position. This resistance may be substituted, for example, for either the resistance at 279 or at 444, or both. Alternatively, the variable resistance may be provided at some other point or points of the circuits.

Figure 15 shows an alternative in which a contoured surface 462 serves as a cam to act on a rod 464 slidable in a carriage 466, similar to 22 and similarly driven, to adjust a contact 468 on a resistance 470, there being thus provided a variable resistance between terminals 472 and 474.

Still another modification is illustrated in Figure 16 in which, when it is permissible that the variations should be discontinuous, there may be provided a board 476, corresponding to the area simulated by the tank, carrying conducting segments 476 which are individually connected to fixed resistors 478, the other terminals of these resistors being connected together and to a terminal 482. A contactor 480 mounted on a carriage similar to 22, and similarly driven, is connected to a terminal 484, with the result that between the terminals 482 and 484 variable resistances will appear as functions of geographical position.

While in the foregoing description the various aspects of the invention have been described with particular reference to a space model of a reservoir analyzer, it will be evident that the inventions are of much broader applicability particularly in the field of other analogs with performance characteristics such that current and potential distributions simulate conditions existing in the systems to which they are analogous. Involved, for example, are analogs simulating electron distributions and the like.

It may also be noted that while the model is disclosed specifically as one involving a current-carrying conductor, the model could equally well provide any potential field such as a magnetic, electrostatic or thermal field. In such case the electrodes could be replaced by corresponding detecting elements (magnetometer and gradiometer, electrometer or thermometric) for potential, equipotential and gradient conditions in the field, and by translation of their signals in usual fashion to corresponding electrical signals the automatic devices described could be controlled.

Figure 13:
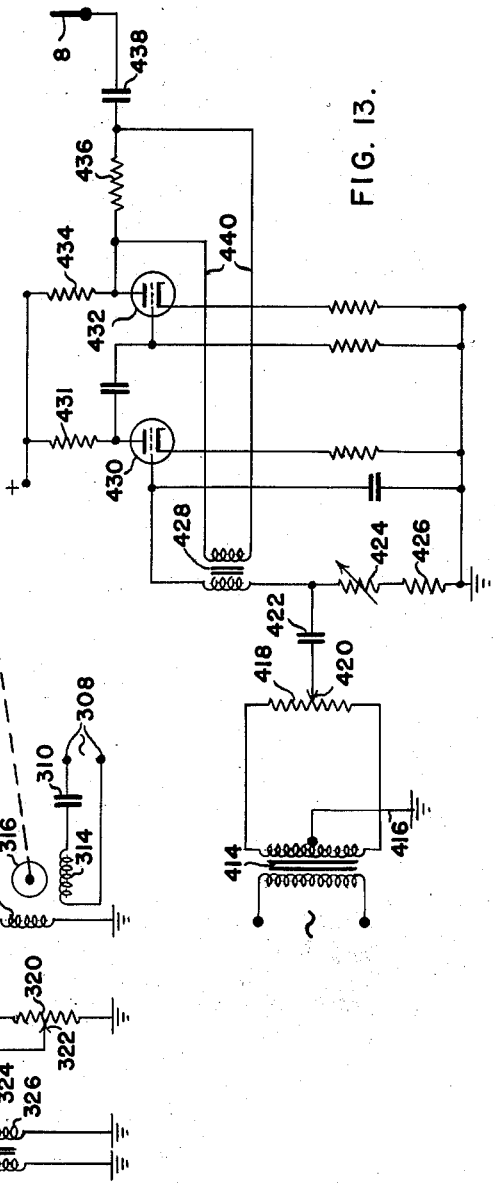
Figure 13 is a wiring diagram showing the type of circuit associated with each well electrode in Figure 1.

In particular, reference may be made to the follower system which has many other applications, and to the type of circuit illustrated in Figure 13 for securing current flows of desired wave forms in non-linear systems. It is accordingly to be understood that the invention is not to be regarded as limited excepted as required by the following claims.

What is claimed is:

1. In combination, a carrier, means mounting said carrier for traversal of an area, a member rotatably mounted on the carrier, means for rotationally positioning said member relatively to the carrier, a marking device mounted on said member, means for positioning said marking device along a linear path relatively to said member and transverse to its axis of rotation, each of said positioning means comprising a balanceable network, a reversible motor, and means responsive to unbalance of the network for controlling said motor in a direction to attain balance of the network.

2. In combination, a conductor disposed over an extended area, means providing current flow through the conductor, a first carrier, means mounting said carrier for traversal of the area of the conductor, a first member rotatably supported by the first carrier, an assembly of probes supported by the first carrier and electrically engaging said conductor with at least one of the probes carried by the first member at a position displaced from its axis of rotation and rotatable therewith, said probes providing a signal of the potential of said conductor at the position of the axis of the first member and a signal of a potential gradient in the conductor directed radially with respect to the axis of the first member and variable in angular position with the angular position of the first member, a second carrier, means mounting the second carrier for traversal of an area corresponding to the area of the conductor, a second member rotatably supported by the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the conductor, a marking device supported by the third carrier, a surface engageable by the marking device, means for positioning the first and third carriers to correspond to the position of the second carrier, means providing corresponding angular positions of the first and second members, with the plane of rotation of the driving wheel corresponding to the angular position of said gradient, and means receiving from said probes said signals of the potential of said conductor and of said gradient and responsive thereto to control the angular positions of the first and second members so that the first carirer and the first member will assume positions in which said signal of the potential of said conductor approximates a predetermined value and said signal of the gradient approximates a zero value, with the result that the first carrier approximately follows an equipotential of said conductor.

3. In combination, a conductor disposed over an extended area, means providing current flow through the conductor, a first carrier, means mounting said carrier for traversal of the area of the conductor, a first member rotatably supported by the first carrier, an assembly of probes supported by the first carrier and electrically engaging said conductor with at least one of the probes carried by the first member at a position displaced from its axis of rotation and rotatable therewith, said probes providing a signal of the potential of said conductor at the position of the axis of the first member and a signal of the difference of potential of two spaced points of the conductor located in a line radial with respect to the axis of the first member and variable in angular position with the angular position of the first member, a second carrier, means mounting the second carrier for traversal of an area corresponding to the area of the conductor, means producing traversal movements of the second carrier, a third carrier, means mounting the third carrier for traversal of an area corresponding to the area of the conductor, a marking device supported by the third carrier, a surface engageable by the marking device, means for positioning the first and third carriers to correspond to the position of the second carrier, means receiving from said probes said signals of the potential of said conductor and of the difference of potential of said two points of the conductor and responsive thereto to control said means producing traversal movements of the second carrier to cause it to move in the direction of the line of said two points so that the first carrier and the first member will assume positions in which said signal of the potential of said conductor approximates a predetermined value and said signal of the difference of potential of said two points approximates a zero value, with the result that the first carrier approximately follows an equipotential of said conductor.

4. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least one of the probes carried by the first member at a position displaced from its axis of rotation and rotatable therewith, said probes providing a signal of the potential of said conductor at the position of the axis of the first member and a signal of a potential gradient in the conductor directed radially with respect to the axis of the first member and variable in angular position with the angular position of the first member, a second carrier, means mounting the second carrier for traversal of an area corresponding to the area of the conductor, a marking device supported by the second carrier, a surface engageable by the marking device, means for producing corresponding positions of the first and second carriers, means receiving from said probes said signals of the potential of said conductor and of said gradient and responsive thereto to effect movements of the first and second carriers in the direction of said gradient and movements of the first member so that the first carrier and the first member will assume positions in which said signal of the potential of said conductor approximates a predetermined value and said signal of the gradient approximates a zero value, with the result that the first carrier approximately follows an equipotential of said conductor.

5. In combination, a conductor disposed over an extended area, means providing current flow through the conductor, a first carrier, means mounting said carrier for traversal of the area of the conductor, a first member rotatably supported by the first carrier, an assembly of probes supported by the first carrier and electrically engaging said conductor with at least one of the probes carried by the first member at a position displaced from its axis of rotation and rotatable therewith, said probes providing a signal of the potential of said conductor at the position of the axis of the first member and a signal of a potential gradient in the conductor directed radially with respect to the axis of the first member and variable in angular position with the angular position of the first member, a second carrier, means mounting the second carrier for traversal of an area corresponding to the area of the conductor, a second member rotatably supported by the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, means for positioning the first carrier to correspond to the position of the second carrier, means providing corresponding angular positions of the first and second members, with the plane of rotation of the driving wheel corresponding to the angular position of said gradient, and means receiving from said probes said signals of the potential of said conductor and of said gradient and responsive thereto to control the angular positions of the first and second members so that the first carrier and the first member will assume positions in which said signal of the potential of said conductor approximates a predetermined value and said signal of the gradient approximates a zero value, with the result that the first carrier approximately follows an equipotential of said conductor.

6. In combination, a conductor disposed over an extended area, means providing current flow through the conductor, a first carrier, means mounting said carrier for traversal of the area of the conductor, a first member rotatably supported by the first carrier, an assembly of probes supported by the first carrier and electrically engaging said conductor with at least one of the probes carried by the first member at a position displaced from its axis of rotation and rotatable therewith, said probes providing a signal of the potential of said conductor at the position of the axis of the first member and a signal of a potential gradient in the conductor directed radially with respect to the axis of the first member and variable in angular position with the angular position of the first member, a second carrier, means mounting the second carrier for traversal of an area corresponding to the area of the conductor, means producing traversal movements of the second carrier, means for positioning the first carrier to correspond to the position of the second carrier, means receiving from said probes said signals of the potential of said conductor and of said gradient and responsive thereto to control said means producing traversal movements of the second carrier to cause it to move in the direction of said gradient so that the first carrier and the first member will assume positions in which said signal of the potential of said conductor approximates a predetermined value and said signal of the gradient approximates a zero value, with the result that the first carrier approximately follows an equipotential of said conductor.

7. In combination, a conductor disposed over an extended area, means providing current flow through the conductor, a carrier, means mounting said carrier for traversal of the area of the conductor, an assembly of probes supported by the carrier and electrically engaging said conductor, said probes providing a signal of the potential of said conductor at the position of the carrier and a signal of a potential gradient in the conductor, at least one of the probes being movable to vary the angular direction of the gradient giving rise to said signal, means receiving from said probes said signals of the potential of said conductor and of said gradient and operating to effect traversal of said carrier and movement of at least said one probe so that the carrier and probe will assume positions in which said signal of the potential of said conductor approximates a predetermined value and said signal of the gradient approximates a zero value, with the result that the carrier approximately follows an equipotential of said conductor.

8. In combination, a conductor disposed over an extended area, means providing current flow through the conductor, a carrier, means mounting said carrier for traversal of the area of the conductor, an assembly of probes supported by the carrier and electrically engaging said conductor, said probes providing a signal of the potential of said conductor at the position of the carrier and a signal of a potential gradient in the conductor, at least one of the probes being movable to vary the angular direction of the gradient giving rise to said signal, means receiving from said probes the signal of said gradient and operating to effect traversal of said carrier and movement of at least said one probe so that the carrier and probe will assume positions in which said signal of the gradient approximates a zero value and the carrier moves in the direction of said gradient, with the result that the carrier approximately follows an equipotential of said conductor.

9. In combination, a conductor disposed over an extended area, means providing current flow through the conductor, a carrier, means mounting said carrier for traversal of the area of the conductor, an assembly of probes supported by the carrier and electrically engaging said conductor, said probes providing a signal of a potential gradient in the conductor, at least one of the probes being movable to vary the angular direction of the gradient giving rise to said signal, means receiving said signal and automatically moving at least said one probe to maintain said signal at approximately zero value, and means coordinated with the last mentioned movements for automatically moving said carrier in a predetermined direction relative to said gradient direction.

10. In combination, a conductor disposed over an extended area, means providing current flow through the conductor, a carrier, means mounting said carrier for traversal of the area of the conductor, an assembly of probes supported by the carrier and electrically engaging said conductor, said probes providing a signal of a potential gradient in the conductor, at least one of the probes being movable to vary the angular direction of the gradient giving rise to said signal, means receiving said signal and automatically moving at least said one probe to maintain said signal at approximately zero value, and means coordinated with the last mentioned movements for automatically moving said carrier in the direction of said gradient.

11. In combination, a conductor disposed over an extended area, means providing current flow through the conductor, a carrier, means mounting said carrier for traversal of the area of the conductor, an assembly of probes supported by the carrier and electrically engaging said conductor, said probes providing a signal of a potential gradient in the conductor, at least one of the probes being movable to vary the angular direction of the gradient giving rise to said signal, means receiving said signal and automatically moving at least said one probe to maintain said signal at approximately zero value, and means coordinated with the last mentioned movements for automatically moving said carrier in a direction normal to said gradient direction.

12. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least two of the probes carried by the first member at positions displaced from its axis of rotation and rotatable therewith, said probes providing a first signal of a first potential gradient in the conductor directed radially with respect to the axis of the first member and variable in angular position with the angular position of the first member, and a second signal of a second potential gradient in the conductor directed radially with respect to the axis of the first member and normal to the direction of said first gradient, a second carrier, means mounting the second carrier for traversal of an area corresponding to the area of the conductor, a second member rotatably supported by the second carrier, means for angularly positioning the second member relatively to the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the conductor, a marking device supported by the third carrier, a surface engageable by the marking device, means for positioning the first and third carriers to correspond to the position of the second carrier, means providing corresponding angular positions of the first and second members, with the plane of rotation of the driving wheel corresponding to the angular position of said second gradient, means receiving from said probes said first signal and responsive thereto to control the angular positions of the first and second members so that the first member will assume positions in which said first signal approximates a zero value, means receiving from said probes said second signal and responsive thereto to control said means for imparting rotation to said driving wheel to drive the driving wheel at a speed proportional to the magnitude of said second signal, and means for controlling said marking device to provide distinguishable markings at equal intervals of time, with the result that the first carrier approximately follows an orthogonal trajectory of equipotentials of said conductor and the marking means provides a line corresponding to said orthogonal trajectory with indications of approximately equal gradient increments therealong.

13. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least two of the probes carried by the first member at positions displaced from its axis of rotation and rotatable therewith, said probes providing a first signal of a first potential gradient in the conductor directed radially with respect to the axis of the first member and variable in angular position with the angular position of the first member, and a second signal of a second potential gradient in the conductor directed radially with respect to the axis of the first member and normal to the direction of said first gradient, a second carrier, means mounting the second carrier for traversal of an area corresponding to the area of the conductor, a second member rotatably supported by the second carrier, means for angularly positioning the second member relatively to the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the conductor, a marking device supported by the third carrier, a surface engageable by the marking device, means for positioning the first and third carriers to correspond to the position of the second carrier, means providing corresponding angular positions of the first and second members, with the plane of rotation of the driving wheel corresponding to the angular position of said second gradient, means receiving from said probes said first signal and responsive thereto to control the angular positions of the first and second members so that the first member will assume positions in which said first signal approximates a zero value, and means receiving from said probes said second signal and responsive thereto to control said means for imparting rotation to said driving wheel to drive the driving wheel at a speed proportional to the magnitude of said second signal, with the result that the first carrier approximately follows an orthogonal trajectory of equipotentials of said conductor and the marking means provides a line corresponding to said orthogonal trajectory.

14. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least two of the probes carried by the first member at positions displaced from its axis of rotation and rotatable therewith, said probes providing a signal of a potential gradient in the conductor directed radially with respect to the axis of the first member and variable in angular position with the angular position of the first member, a second carrier, means mounting the second carrier for traversal of an area corresponding to the area of the conductor, a second member rotatably supported by the second carrier, means for angularly positioning the second member relatively to the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the conductor, a marking device supported by the third carrier, a surface engageable by the marking device, means for positioning the first and third carriers to correspond to the position of the second carrier, means providing corresponding angular positions of the first and second members, with the plane of rotation of the driving wheel corresponding to a normal to the direction of said gradient, and means receiving from said probes said signal and responsive thereto to control the angular positions of the first and second members so that the first member will assume positions in which said signal approximates a zero value, with the result that the first carrier approximately follows an orthogonal trajectory of equipotentials of said conductor and the marking means provides a line corresponding to said orthogonal trajectory.

15. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least one of the probes carried by the first member at a position displaced from its axis and rotatable thereabout, said probes providing a signal of a potential gradient in the conductor directed radially with respect to the axis of the first member and variable in angular position with the angular position of the first member, a second carrier, means mounting the second carrier for traversal of an area corresponding to the area of the conductor, a second member rotatably supported by the second carrier, means for angularly positioning the second member relatively to the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, means for positioning the first carrier to correspond to the position of the second carrier, means providing corresponding angular positions of the first and second members, with the plane of rotation of the driving wheel corresponding to a normal to the direction of said gradient, and means receiving from said probes said signal and responsive thereto to control the angular positions of the first and second members so that the first member will assume positions in which said second signal approximates a zero value, with the result that the first carrier approximately follows an orthogonal trajectory of equipotentials of said conductor.

16. In combination, a conductor disposed over an extended area, means providing current flow through the conductor, a carrier, means mounting said carrier for traversal of the area of the conductor, an assembly of probes supported by the carrier and electrically engaging said conductor with at least one of the probes displaced from an axis and rotatable thereabout, said probes providing a signal of a potential gradient in the conductor directed radially with respect to said axis and variable in angular position with rotation of said rotatable probe, means responsive to said signal and controlled thereby to rotate said rotatable probe, so that the probes will assume relative positions in which said signal approximates a zero value, and means coordinated with the last mentioned rotation for automatically traversing said carrier in a direction orthogonal to the direction of said gradient with the result that the first carrier approximately follows an orthogonal trajectory of equipotentials of said conductor.

17. In combination, a conductor disposed over an extended area, means providing current flow through the conductor, a carrier, means mounting said carrier for traversal of the area of the conductor, means determining the vectorial direction of an equipotential of said conductor at the position of the carrier, and means controlled by the last mentioned means for moving the carrier in the direction of the equipotential at each position of the carrier.

18. In combination, a conductor disposed over an extended area, means providing current flow through the conductor, a carrier, means mounting said carrier for traversal of the area of the conductor, means determining the direction of an equipotential of said conductor at the position of the carrier, and means controlled by the last mentioned means for moving the carrier in a direction orthogonal to the direction of the equipotential at each position of the carrier.

19. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least two of the probes carried by the first member at positions displaced from its axis of rotation and rotatable therewith, said probes providing a first signal of a first potential gradient in the conductor directed radially with respect to the axis of the first member and variable in angular position with the angular position of the first member, and a second signal of a second potential gradient in the conductor directed radially with respect to the axis of the first member and normal to the direction of said first gradient, a second carrier, means mounting the second carrier for traversal of an area corresponding to the area of the conductor, a second member rotatably supported by the second carrier, means for angularly positioning the second member relatively to the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the conductor, a third member rotatably supported by the third carrier, a marking device carried by the third member and displaceable radially with respect to the axis of the third member, a surface engageable by the marking device, means for positioning the first and third carriers to correspond to the position of the second carrier, means providing corresponding angular positions of the first and third members, means receiving from said probes said first signal and responsive thereto to control the angular positions of the first and third members so that the first member will assume positions in which said first signal approximates a zero value, and means receiving from said probes said second signal and responsive thereto to displace said marking device from the axis of the third member in linear relationship to the magnitude of said second signal.

20. In combination, a conductor disposed over an extended area, means providing current flow through the conductor, a first carrier, means mounting said carrier for traversal of the area of the conductor, a first member rotatably supported by the first carrier, means for angularly positioning the first member relatively to the first carrier, an assembly of probes supported by the first carrier and electrically engaging said conductor with at least two of the probes carried by the first member at positions displaced from its axis of rotation and rotatable therewith, said probes providing a first signal of a first potential gradient in the conductor directed radially with respect to the axis of the first member and variable in angular position with the angular position of the first member, and a second signal of a second potential gradient in the conductor directed radially with respect to the axis of the first member and normal to the direction of said first gradient, a second carrier, means mounting the second carrier for traversal of an area corresponding to the area of the conductor, a second member rotatably supported by the second carrier, a marking device carried by the second member and displaceable radially with respect to the axis of the second member, a surface engageable by the marking device, means for positioning the first and second carriers in corresponding traverse positions, means providing corresponding angular positions of the first and second members, means receiving from said probes said first signal and responsive thereto to control the angular positions of the first and second members so that the first member will assume positions in which said first signal approximates a zero value, means receiving from said probe said second signal and responsive thereto to displace said marking device from the axis of the second member in linear relationship to the magnitude of said second signal.

21. In combination, a conductor disposed over an extended area, means providing current flow through the conductor, a first carrier, means mounting said first carrier for traversal of the area of the conductor, means determining the direction of an equipotential of said conductor at the position of the first carrier, a second carrier, means mounting said second carrier for traversal of an area corresponding to the area of the conductor, a marking device carried by the second carrier and displaceable relatively thereto, means for positioning the first and second carriers in corresponding positions, and means for displacing said marking device relatively to said second carrier to an extent linearly related to the maximum gradient of said conductor at the position of the first carrier and in the direction of said gradient.

22. In combination, means providing a potential field disposed over an extended area, a first carrier, means mounting said carrier for traversal of the area of said field, a first member rotatably supported by the first carrier, detecting elements supported by the first carrier and adapted to sample potentials in said field with at least one of the detecting elements carried by the first member and rotatable therewith, said detecting elements providing a signal of the potential of said field at the position of the axis of the first member and a signal of a potential gradient in the field directed radially with respect to the axis of the first member and variable in angular position with the angular position of the first member, a second carrier, means mounting the second carrier for traversal of an area corresponding to the area of the field, a second member rotatably supported by the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, a third carrier, means mounting the third carrier for traversal of an area corresponding to the area of the field, a marking device supported by the third carrier, a surface engageable by the marking device, means for positioning the first and third carriers to correspond to the position of the second carrier, means providing corresponding angular positions of the first and second members, with the plane of rotation of the driving wheel corresponding to the angular position of said gradient, and means receiving from said detecting elements said signals of the potential of said field and of said gradient and responsive thereto to control the angular positions of the first and second members so that the first carrier and the first member will assume positions in which said signal of the potential of said field approximates a predetermined value and said signal of the gradient approximates a zero value, with the result that the first carrier approximately follows an equipotential of said field.

23. In combination, means providing a potential field disposed over an extended area, a first carrier, means mounting said carrier for traversal of the area of said field, a first member rotatably supported by the first carrier, detecting elements supported by the first carrier and adapted to sample potentials in said field with at least one of the elements carried by the first member and rotatable therewith, said elements providing a signal of the potential of said field at the position of the axis of the first member and a signal of a potential gradient in the field directed radially with respect to the axis of the first member and variable in angular position with the angular position of the first member, a second carrier, means mounting the second carrier for traversal of an area corresponding to the area of the field, means producing traversal movements of the second carrier, a third carrier, means mounting the third carrier for traversal of an area corresponding to the area of the field, a marking device supported by the third carrier, a surface engageable by the marking device, means for positioning the first and third carriers to correspond to the position of the second carrier, means receiving from said detecting elements said signals of the potential of said field and of said gradient and responsive thereto to control said means producing traversal movements of the second carrier to cause it to move in the direction of said gradient so that the first carrier and the first member will assume positions in which said signal of the potential of said field approximates a predetermined value and said signal of the gradient approximates a zero value, with the result that the first carrier approximately follows an equipotential of said field.

24. In combination, means providing a potential field disposed over an extended area, a first carrier, means mounting said carrier for traversal of the area of said field, a first member rotatably supported by the first carrier, means for angularly positioning the first member relatively to the first carrier, detecting elements supported by the first carrier and adapted to sample potentials in said field with at least one of the elements carried by the first member and rotatable therewith, said elements providing a signal of the potential of said field at the position of the axis of the first member and a signal of a potential gradient in the field directed radially with respect to the axis of the first member and variable in angular position with the angular position of the first member, a second carrier, means mounting the second carrier for traversal of an area corresponding to the area of the field, a marking device supported by the second carrier, a surface engageable by the marking device, means for producing corresponding positions of the first and second carriers, means receiving from said elements said signals of the potential of said field and of said gradient and responsive thereto to effect automatically movements of the first and second carriers in the direction of said gradient and movements of the first member so that the first carrier and the first member will assume positions in which said signal of the potential of said field approximates a predetermined value and said signal of the gradient approximates a zero value, with the result that the first carrier approximately follows an equipotential of said field.

25. In combination, means providing a potential field disposed over an extended area, a first carrier, means mounting said carrier for traversal of the area of said field, a first member rotatably supported by the first carrier, detecting elements supported by the first carrier and adapted to sample potentials in said field with at least one of the elements carried by the first member rotatable therewith, said elements providing a signal of the potential of said field at the position of the axis of the first member and a signal of a potential gradient in the field directed radially with respect to the axis of the first member and variable in angular position with the angular position of the first member, a second carrier, means mounting the second carrier for traversal of an area corresponding to the area of the field, a second member rotatably supported by the second carrier, a driving wheel mounted on the second member so that its plane of rotation is angularly positioned in accordance with the angular position of the second member, a surface engaged by said driving wheel, means for imparting rotation to said driving wheel to cause, by its engagement with said surface, traversal by the second carrier along a path determined by angular position of the second member, means for positioning the first carrier to correspond to the position of the second carrier, means providing corresponding angular positions of the first and second members, with the plane of rotation of the driving wheel corresponding to the angular position of said gradient, and means receiving from said elements said signals of the potential of said field and of said gradient and responsive thereto to control the angular positions of the first and second members so that the first carrier and the first member will assume positions in which said signal of the potential of said field approximates a predetermined value and said signal of the gradient approximates a zero value, with the result that the first carrier approximately follows an equipotential of said field.

26. In combination, means providing a potential field disposed over an extended area, a first carrier, means mounting said carrier for traversal of the area of said field, a first member rotatably supported by the first carrier, detecting elements supported by the first carrier and adapted to sample potentials in said field with at least one of the elements carried by the first member rotatable therewith, said elements providing a signal of the potential of said field at the position of the axis of the first member and a signal of a potential gradient in the field directed radially with respect to the axis of the first member and variable in angular position with the angular position of the first member, a second carrier, means mounting the second carrier for traversal of an area corresponding to the area of the field, means producing traversal movements of the second carrier, means for positioning the first carrier to correspond to the position of the second carrier, means receiving from said elements said signals of the potential of said field and of said gradient and responsive thereto to control said means producing traversal movements of the second carrier to cause it to move in the direction of said gradient so that the first carrier and the first member will assume positions in which said signal of the potential of said field approximates a predetermined value and said signal of the gradient approximates a zero value, with the result that the first carrier approximately follows an equipotential of said field.

27. In combination, means providing a potential field disposed over an extended area, a carrier, means mounting said carrier for traversal of the area of said field, detecting elements supported by the carrier and adapted to sample potentials in said field, said elements providing a signal of the potential of said field at the position of the carrier and a signal of a potential gradient in the field, at least one of the elements being movable to vary the angular direction of the gradient giving rise to said signal, means receiving from said elements said signals of the potential of said field and of said gradient and operating to effect traversal of said carrier and movement of an element so that the carrier and element will assume positions in which said signal of the potential of said field approximates a predetermined value and said signal of the gradient approximates a zero value, with the result that the carrier approximately follows an equipotential of said field.

28. In combination, means providing a potential field disposed over an extended area, a carrier, means mounting said carrier for traversal of the area of the field, detecting elements supported by the carrier and adapted to sample potentials in said field, said elements providing a signal of the potential of said field at the position of the carrier and a signal of a potential gradient in the field, at least one of the elements being movable to vary the angular direction of the gradient giving rise to said signal, means receiving from said elements the signal of the gradient and operating to effect traversal of said carrier and movement of an element so that the carrier and element will assume positions in which said signal of the gradient approximates a zero value and the carrier moves in the direction of said gradient, with the result that the carrier approximately follows an equipotential of said field.

29. In combination, means providing a potential field disposed over an extended area, a carrier, means mounting said carrier for traversal of the area of the field, detecting means supported by the carrier and adapted to sample potential in said field, said detecting means providing a signal of a gradient in said field, the detecting means being movable to vary the angular direction of the line along which the gradient is detected, means receiving said signal and automatically moving said detecting means to maintain said signal at approximately zero value, and means for moving said carrier automatically in a predetermined direction relative to said line.

30. In combination, means providing a potential field disposed over an extended area, a carrier, means mounting said carrier for traversal of the area of the field, detecting means supported by the carrier and adapted to sample potentials in said field, said detecting means providing a signal of a gradient in said field, the detecting means being movable to vary the angular direction of the line along which the gradient is detected, means receiving said signal and automatically moving said detecting means to maintain said signal at approximately zero value, and means for moving said carrier automatically in the direction of said line.

31. In combination, means providing a potential field disposed over an extended area, a carrier, means mounting said carrier for traversal of the area of said field, detecting means supported by the carrier and adapted to sample potentials in said field, said detecting means providing a signal of a gradient in said field, the detecting means being movable to vary the angular direction of the line along which the gradient is detected, means receiving said signal and automatically moving said detecting means to maintain said signal at approximately zero value, and means for moving said carrier automatically in a direction normal to said line.

32. In combination, means providing a potential field disposed over an extended area, a carrier, means mounting said carrier for traversal of the area of said field, detecting means rotatably supported by the carrier and adapted to sample potentials in said field, said detecting means providing a signal of a gradient in said field variable in angular position with rotation of the detecting means, means responsive to said signal and controlled thereby to rotate said detecting means, so that the detecting means will assume positions in which said signal approximates a zero value, and means automatically traversing said carrier in a direction orthogonal to said line with the result that the first carrier approximately follows an orthogonal trajectory of equipotentials of said field.

33. In combination, means providing a potential field disposed over an extended area, a carrier, means mounting said carrier for traversal of the area of the field, means determining the vectorial direction of an equipotential of said field at the position of the carrier, and means controlled by the last mentioned means for moving the carrier in the direction of the equipotential at each position of the carrier.

34. In combination, means providing a potential field disposed over an extended area, a carrier, means mounting said carrier for traversal of the area of the field, means determining the direction of an equipotential of said field at the position of the carrier, and means controlled by the last mentioned means for moving the carrier in a direction orthogonal to the direction of the equipotential at each position of the carrier.

35. In combination, means providing a potential field disposed over an extended area, a first carrier, means mounting said first carrier for traversal of the area of said field, means determining the direction of an equipotential of said field at the position of the first carrier, a second carrier, means mounting said second carrier for traversal of an area corresponding to the area of the field, a marking device carried by the second carrier and displaceable relatively thereto, means for positioning the first and second carriers in corresponding positions, and means for displacing said marking device relatively to said second carrier to an extent linearly related to the maximum gradient of said field at the position of the first carrier and in the direction of said gradient.

References Cited in the file of this patent

UNITED STATES PATENTS

| | | |
|---|---|---|
| 2,122,258 | Louviaux | June 28, 1938 |
| 2,473,983 | Wolf | June 21, 1949 |
| 2,489,689 | Wald | Nov. 29, 1949 |
| 2,494,663 | Lobosco | Jan. 17, 1950 |
| 2,522,851 | Tyrner | Sept. 19, 1950 |
| 2,542,490 | Ehrenfried | Feb. 20, 1951 |
| 2,547,950 | Lee et al. | Apr. 10, 1951 |
| 2,567,202 | Goertz | Sept. 11, 1951 |
| 2,569,510 | Wolf | Oct. 2, 1951 |
| 2,569,817 | Wolf et al. | Oct. 2, 1951 |
| 2,569,818 | Lee | Oct. 2, 1951 |
| 2,713,651 | Coffey | July 19, 1955 |

OTHER REFERENCES

Automatic Plotting of Electrostatic Fields (Green, Jr.), The Review of Scientific Instruments, vol. 19, No. 10, October 1948, pages 646–653.

"Electronic Instruments," Greenwood, Holdam and MacRae, McGraw-Hill, 1948, Figure 6.31.